US012602671B1

(12) United States Patent
Robertson et al.

(10) Patent No.:  US 12,602,671 B1
(45) Date of Patent:  Apr. 14, 2026

(54) SYSTEM AND METHOD FOR DIGITAL CURRENCY MANAGEMENT USING A BEARER INSTRUMENT

(71) Applicant: Arx Research, Inc., New York, NY (US)

(72) Inventors: Charles Cameron Robertson, Boulder, CO (US); David Joshua Myers, Hudson, NY (US); Michal Leszczynski, Warsaw (PL)

(73) Assignee: Arx Research, Inc., New York, NY (US)

( * ) Notice: Subject to any disclaimer, the term of this patent is extended or adjusted under 35 U.S.C. 154(b) by 0 days.

(21) Appl. No.: 19/008,542

(22) Filed: Jan. 2, 2025

(51) Int. Cl.
| | |
|---|---|
| *G06Q 20/34* | (2012.01) |
| *G06Q 20/06* | (2012.01) |
| *G06Q 20/38* | (2012.01) |
| *G06Q 20/20* | (2012.01) |
| *G06Q 20/32* | (2012.01) |

(52) U.S. Cl.
CPC ....... *G06Q 20/0658* (2013.01); *G06Q 20/342* (2013.01); *G06Q 20/3829* (2013.01); *G06Q 20/389* (2013.01); *G06Q 20/204* (2013.01); *G06Q 20/322* (2013.01)

(58) Field of Classification Search
None
See application file for complete search history.

(56) References Cited

U.S. PATENT DOCUMENTS

| | | | | |
|---|---|---|---|---|
| 2019/0130387 | A1* | 5/2019 | Arora | H04L 9/3247 |
| 2019/0370446 | A1* | 12/2019 | Davis | G06Q 20/341 |
| 2019/0377889 | A1* | 12/2019 | Mertens | G06F 21/60 |
| 2020/0005293 | A1* | 1/2020 | Opeola | G06Q 20/065 |
| 2020/0294011 | A1* | 9/2020 | Robertson | H04L 9/0637 |
| 2021/0312431 | A1* | 10/2021 | Ravinathan | G06Q 20/0658 |
| 2023/0069875 | A1* | 3/2023 | Ahmad | G06Q 20/3829 |

FOREIGN PATENT DOCUMENTS

WO    WO-2025051642 A1 *  3/2025  ........... G06Q 20/065

OTHER PUBLICATIONS

Andreas M. Antonopoulos, "Mastering Bitcoin", Publisher: O'Reilly Media, Inc., Release Date: Dec. 2014 (Year: 2014).*

* cited by examiner

*Primary Examiner* — Patrick McAtee
*Assistant Examiner* — Jason B Fenstermacher
(74) *Attorney, Agent, or Firm* — Cognition IP, P.C.; Edward Steakley

(57)    ABSTRACT

Systems and methods for managing and operating secure cryptocurrency or digital currency devices that mimics traditional open loop gift card aesthetics and capabilities, with significant additional capabilities that give them the benefits of cash while still being able to store and receive varying amounts of funds in a single physical instance.

9 Claims, 26 Drawing Sheets

320

Perform, by a client device, a first scan, wherein the first scan comprises reading information from a source card device. — 321

Verify, based on the first scan, a transfer state of the source card device and the client device, the transfer state corresponding to the source card device and the client device being allowed to transfer funds. — 322

Perform, by the client device, a second scan, wherein the second scan comprises reading information from a target card device. — 323

Verify, based on the second scan, a receive state of the target card device, the receive state corresponding to the target card device being allowed to receive funds. — 324

Verify, based on the first scan and the second scan, authenticity of the source card device and the target card device. — 325

Generate a shared secret based on a source signature signed from a source public key material of the source card device and a target signature signed from a target public key material of a target card device. — 326

Duplicate, onto the target card device, a source private key material of the source card device. — 327

Delete, from the source card, the source private key material. — 328

Verify that the target card device holds the duplicated source private key material and that the source card device no longer holds the source private key material. — 329

100

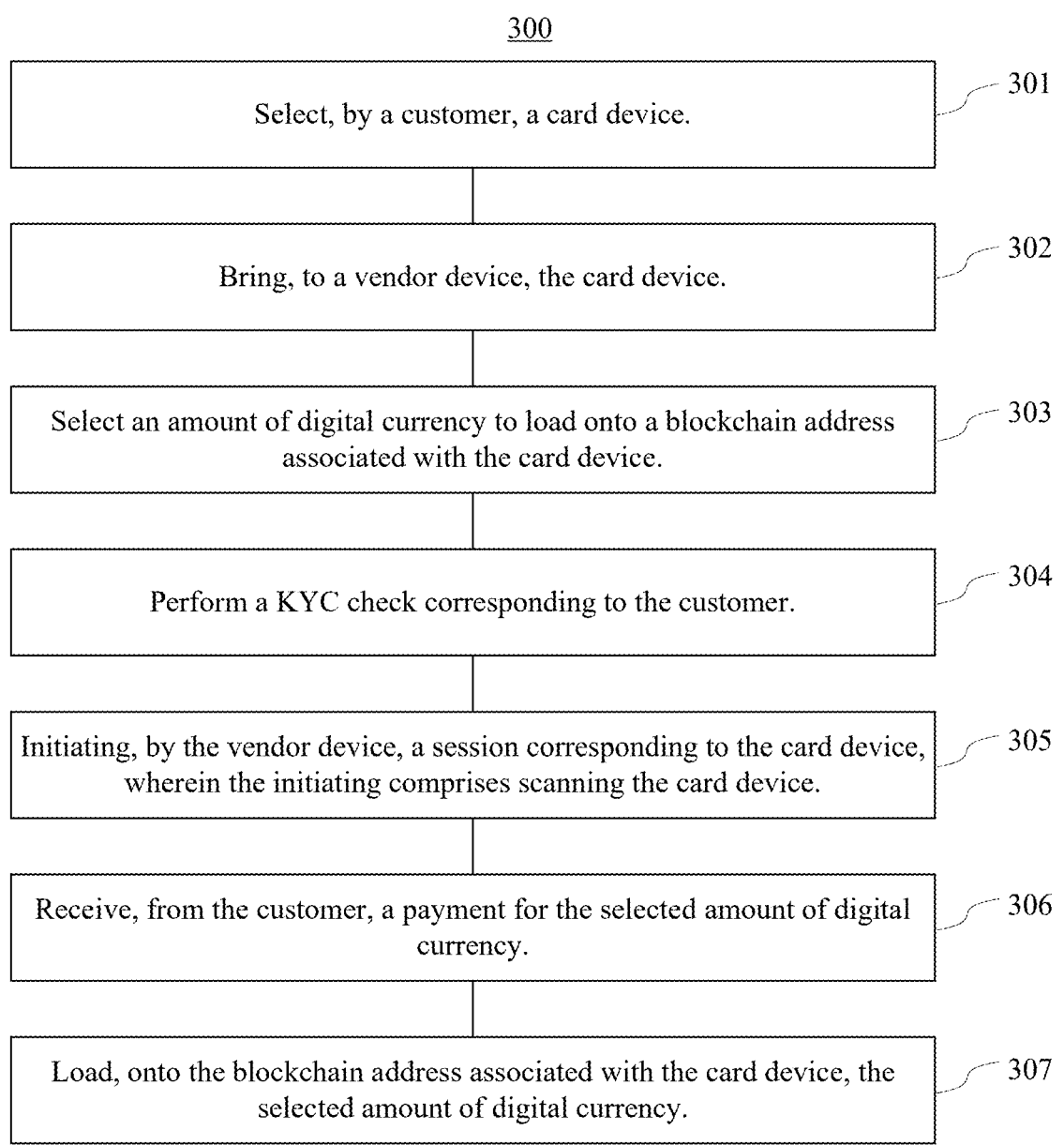

300

Select, by a customer, a card device.   301

Bring, to a vendor device, the card device.   302

Select an amount of digital currency to load onto a blockchain address associated with the card device.   303

Perform a KYC check corresponding to the customer.   304

Initiating, by the vendor device, a session corresponding to the card device, wherein the initiating comprises scanning the card device.   305

Receive, from the customer, a payment for the selected amount of digital currency.   306

Load, onto the blockchain address associated with the card device, the selected amount of digital currency.   307

FIG. 3A

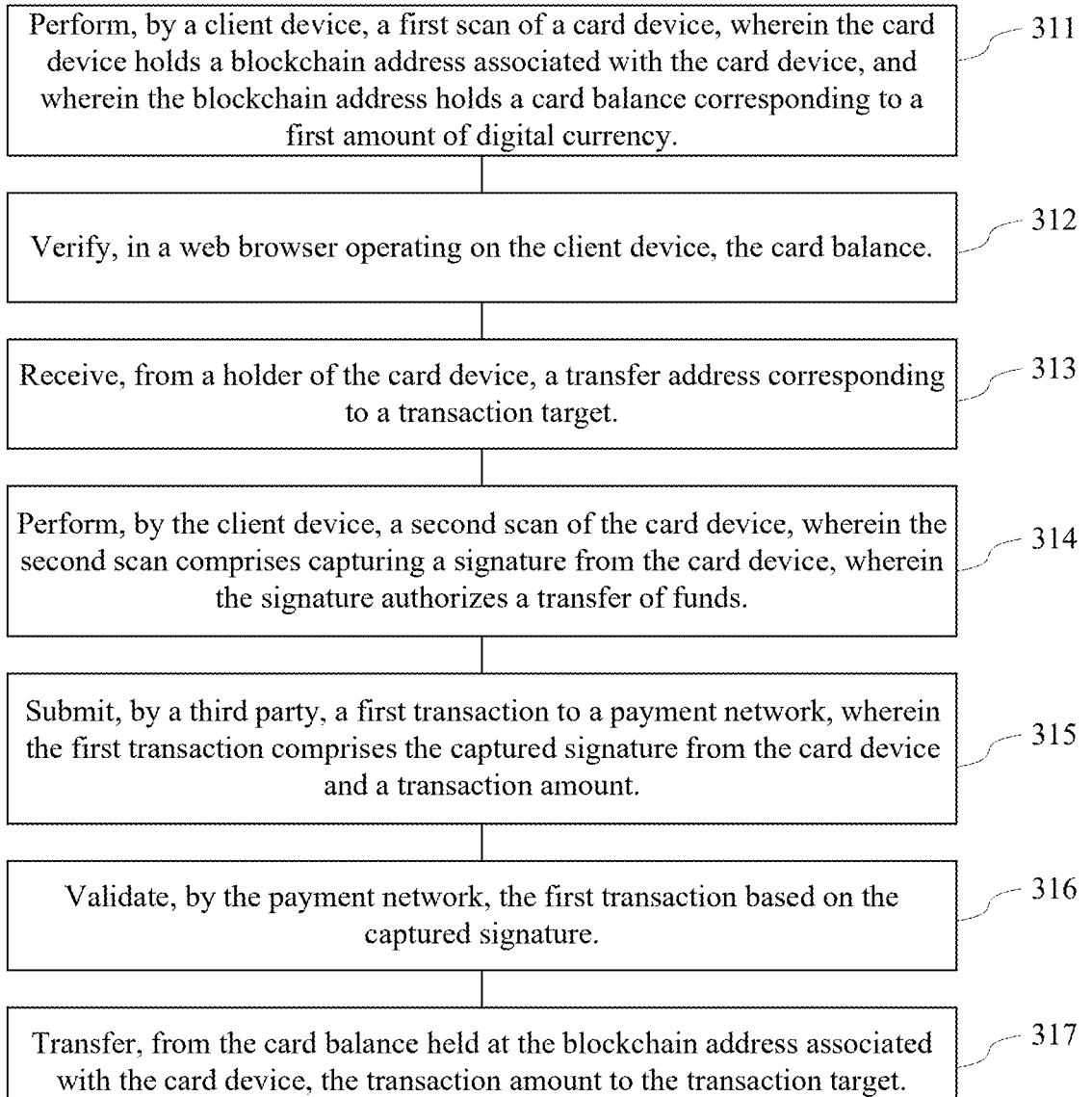

310

Perform, by a client device, a first scan of a card device, wherein the card device holds a blockchain address associated with the card device, and wherein the blockchain address holds a card balance corresponding to a first amount of digital currency. — 311

Verify, in a web browser operating on the client device, the card balance. — 312

Receive, from a holder of the card device, a transfer address corresponding to a transaction target. — 313

Perform, by the client device, a second scan of the card device, wherein the second scan comprises capturing a signature from the card device, wherein the signature authorizes a transfer of funds. — 314

Submit, by a third party, a first transaction to a payment network, wherein the first transaction comprises the captured signature from the card device and a transaction amount. — 315

Validate, by the payment network, the first transaction based on the captured signature. — 316

Transfer, from the card balance held at the blockchain address associated with the card device, the transaction amount to the transaction target. — 317

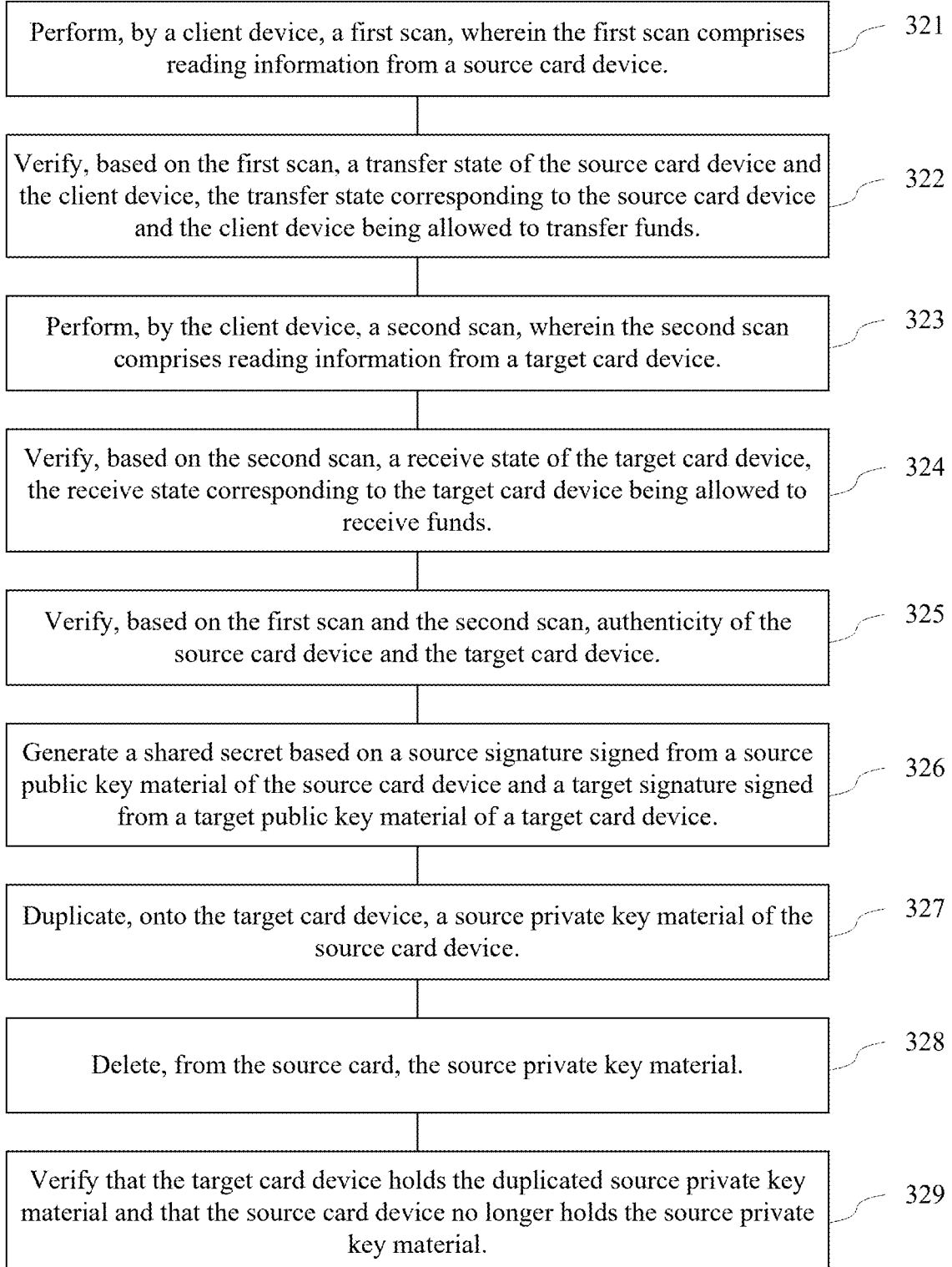

Perform, by a client device, a first scan, wherein the first scan comprises reading information from a source card device. — 321

Verify, based on the first scan, a transfer state of the source card device and the client device, the transfer state corresponding to the source card device and the client device being allowed to transfer funds. — 322

Perform, by the client device, a second scan, wherein the second scan comprises reading information from a target card device. — 323

Verify, based on the second scan, a receive state of the target card device, the receive state corresponding to the target card device being allowed to receive funds. — 324

Verify, based on the first scan and the second scan, authenticity of the source card device and the target card device. — 325

Generate a shared secret based on a source signature signed from a source public key material of the source card device and a target signature signed from a target public key material of a target card device. — 326

Duplicate, onto the target card device, a source private key material of the source card device. — 327

Delete, from the source card, the source private key material. — 328

Verify that the target card device holds the duplicated source private key material and that the source card device no longer holds the source private key material. — 329

FIG. 3C

Group Spend : Duplicating
The Card Devices

Gifting A Card Device

Reload A Card Remotely Without Financial
Intermediary

Reload A Card Remotely Without Financial
Intermediary

Load Gift Card onto Virtual Wallet and Spend Funds
From the Virtual Wallet

Conversion To Merchant Specific Assets
And Spending Said Assets

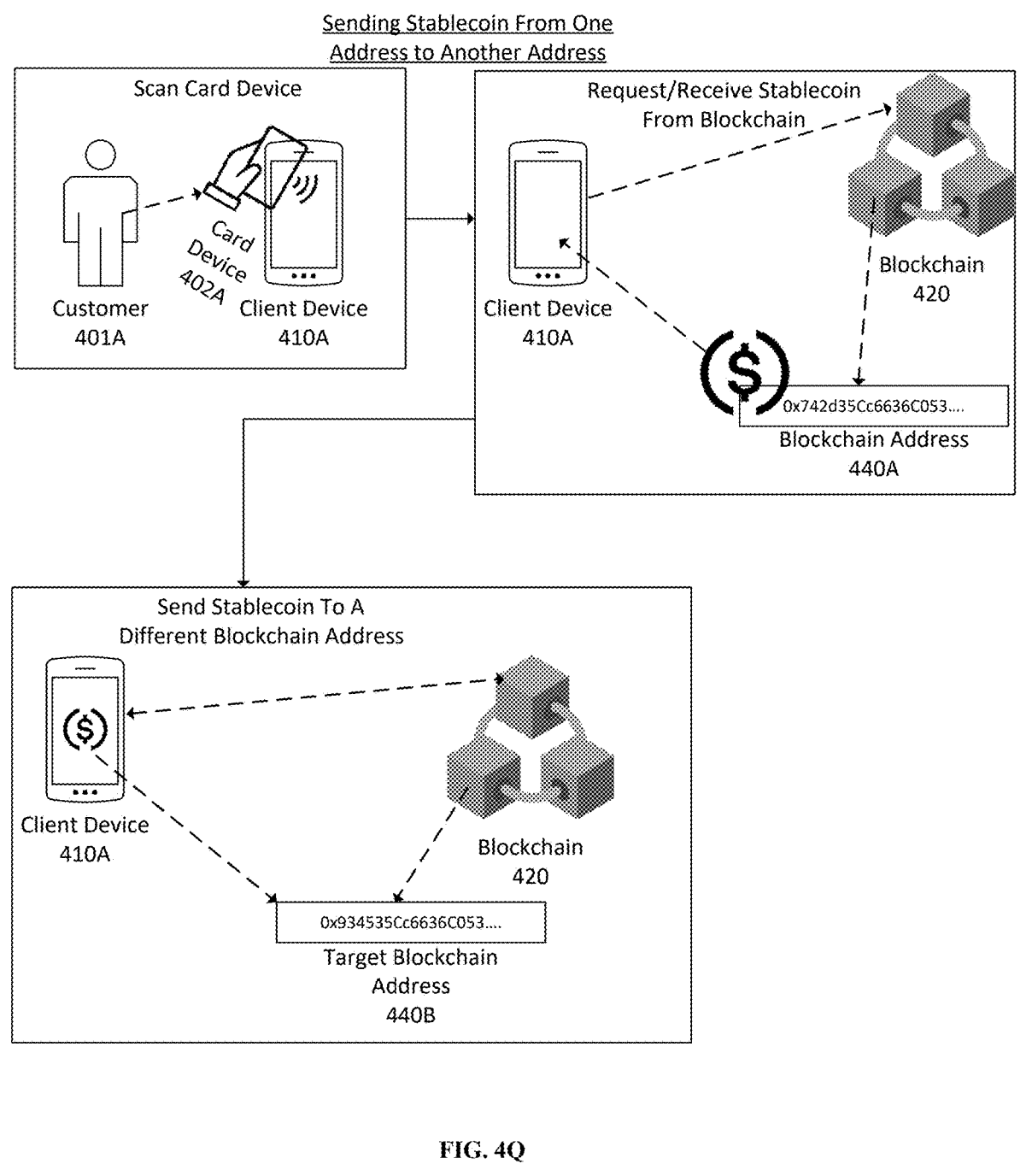

Sending Stablecoin From One
Address to Another Address

Scan Card Device

Customer
401A

Card
Device
402A

Client Device
410A

Request/Receive Stablecoin
From Blockchain

Client Device
410A

Blockchain
420

0x742d35Cc6636C053....

Blockchain Address
440A

Send Stablecoin To A
Different Blockchain Address

Client Device
410A

Blockchain
420

0x934535Cc6636C053....

Target Blockchain
Address
440B

FIG. 4Q

Sending Stablecoin From One
Address to Another Address
Scan Card Device
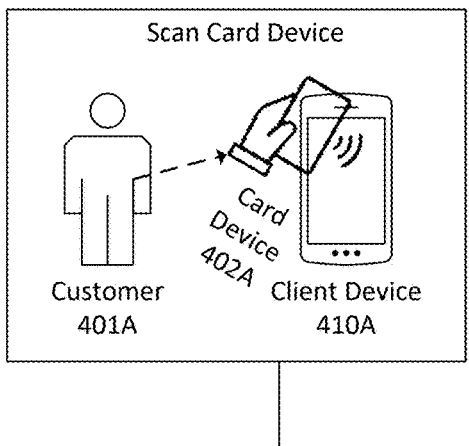
Customer
401A
Card
Device
402A
Client Device
410A
Transfer Funds Between Blockchain Addresses
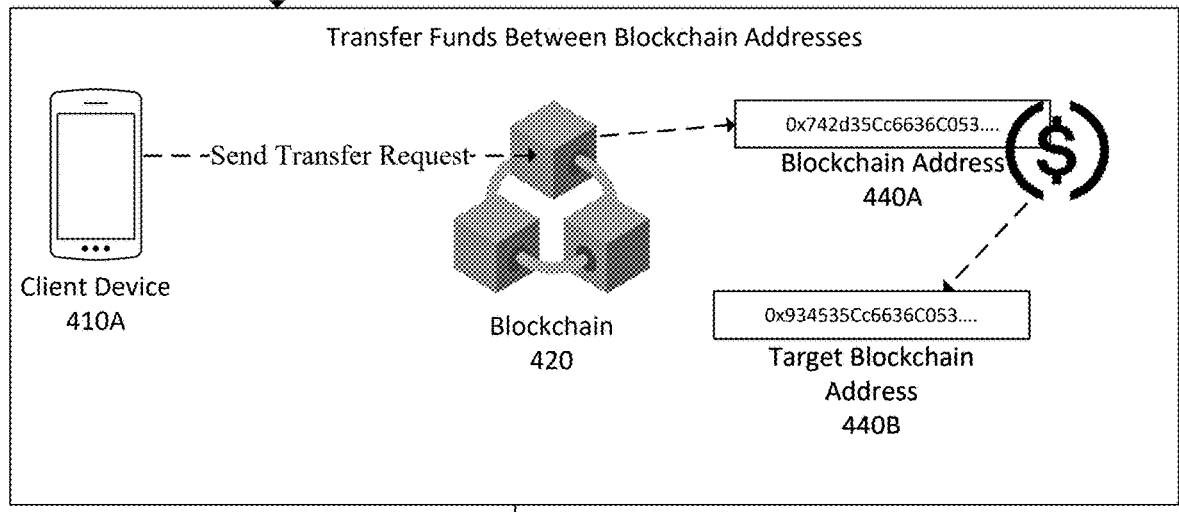
Client Device
410A
– – Send Transfer Request – – ➤
Blockchain
420
0x742d35Cc6636C053....
Blockchain Address
440A
0x934535Cc6636C053....
Target Blockchain
Address
440B
Funds Updated After Transfer
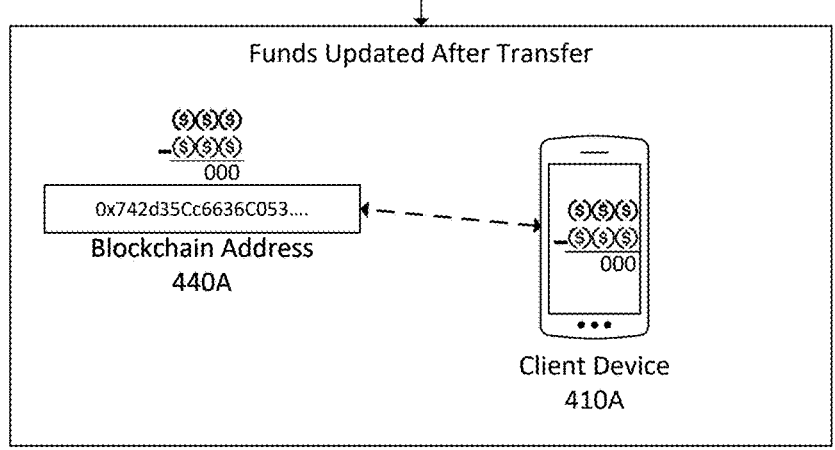
000
0x742d35Cc6636C053....
Blockchain Address
440A
000
Client Device
410A
FIG. 4R

Sending Virtual Card Device
From One Device to Another
Device Off Blockchain

FIG. 4U

SYSTEM AND METHOD FOR DIGITAL CURRENCY MANAGEMENT USING A BEARER INSTRUMENT

FIELD

The present invention relates generally to systems, tools and methods to securely store and transfer digital currency using a physical bearer instrument.

BACKGROUND

Traditional gift cards typically fall into one of two schemes, open loop and closed loop. With closed loop prepaid/gift cards, customers/users purchase a card with a known value that can be used for future goods/services from the business which issued the card.

Existing prepaid/gift cards in an open loop scheme are issued under the backing of a payment network and are widely accepted as other similarly branded credit/debit cards, not just with the company which sold them to the customer.

Open loop prepaid/gift cards fall into very controlled categories whereby they can be freely loaded without additional information on the part of the customer up to certain amounts per day, e.g., $2,000 per day. Vendors need to make reasonable efforts to ensure that these limits are not surpassed.

SUMMARY

The systems and methods described herein provide for a digital currency management platform, wherein the digital currency management platform may comprise a first card device, a client device and a vendor device.

In some embodiments, the first card device may comprise a first communication module, a first card key generator module, a first card key management module and a first card encryption module. The client device may comprise a client network module, a client card communication module, a client device input module, a client display module, and a client secure application module, wherein the client secure application module may further comprise a virtual wallet module, a client key generator module, a client key management module and a client secure user input module.

In some embodiments, the vendor device may comprise a vendor network module a vendor card communication module, a vendor device input module, a vendor display module and a vendor secure application module, wherein the vendor secure application module may further comprise a vendor secure user input module, a vendor blockchain transaction module and a vendor virtual target card device. The virtual target card device may be configured to generate vendor keys, manage vendor keys, encrypt keys and information, decrypt keys and information and store information of the state of the vendor virtual target card.

In some embodiments, the vendor device may be configured to perform a KYC check corresponding to a holder of the first card device. The vendor device may also initiate a session with the first card device, wherein the initiating may comprise requesting the first card device sign a signature to verify its authenticity, retrieving public key information for the first card device, associating the public key information with the session, receiving a payment from the holder, wherein the payment is a first amount in a first currency, creating a blockchain address linked to the holder and the first card device and transferring an amount of a first digital currency to the blockchain address, wherein the amount of the first digital currency is equivalent to the received payment from the holder.

In some embodiments, the first card device further comprises a first hashing module, wherein the first hashing module may be configured to hash each digest signed. The hashing may further comprise hashing a current digest signed with an internally stored historic hash, wherein the historic hash contains all previous hashes of hashes.

In some embodiments, the first card device may further comprise a first card state module, wherein the first card state module may be configured to store a duplication state of the first card device. The duplication state may indicate whether the first card device has been duplicated or not. The card device may further be configured to store a duplication count for the first card device, store information corresponding to the origin of a key, wherein the origin indicates that the key originated from the first card device or holds a duplicate of the key, store information indicating if the first card device served as a source of a duplication procedure, wherein the duplication procedure comprises transferring data from the first card device to a target card device.

In some embodiments, the first card device may further be configured to perform an offline transfer procedure. The offline transfer procedure may further comprise: performing, by the client device, a first scan of the first card device; verifying, based on the first scan, a transfer state of the first card device and the client device, wherein the transfer state corresponds to an authorization of the first card device and client device being allowed to transfer funds stored in the blockchain address; performing, by the client device, a second scan of a receiving card device; verifying, based on the second scan, a receive state of a receiving card device, wherein the receiving state corresponds to the receiving card device being allowed to receive funds; verifying, based on the first scan and the second scan, authenticity of the first card device and the receiving card device; generating a shared secret based on a source signature signed from a source public key material of the first card device and a target signature signed from a target public key material of a receiving card device; duplicating, onto the receiving card device, a source private key material of the first card device; deleting, from the first card device, the source private key material; and verifying that the receiving card device holds the duplicated source private key material and that the first card device no longer holds the source private key material.

The appended claims may also serve as a summary of this application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 3A is a flow chart illustrating an exemplary method that may be performed in accordance with some embodiments.

FIG. 3B is a flow chart illustrating an exemplary method that may be performed in accordance with some embodiments.

FIG. 3C is a flow chart illustrating an exemplary method that may be performed in accordance with some embodiments.

FIG. 4Q is a diagram illustrating an exemplary use case of the digital currency device in accordance with aspects of the present disclosure.

FIG. 4R is a diagram illustrating an exemplary use case of the digital currency device in accordance with aspects of the present disclosure.

FIG. 4U is a diagram illustrating an exemplary use case of the digital currency device in accordance with aspects of the present disclosure.

DETAILED DESCRIPTION

Figure 1:
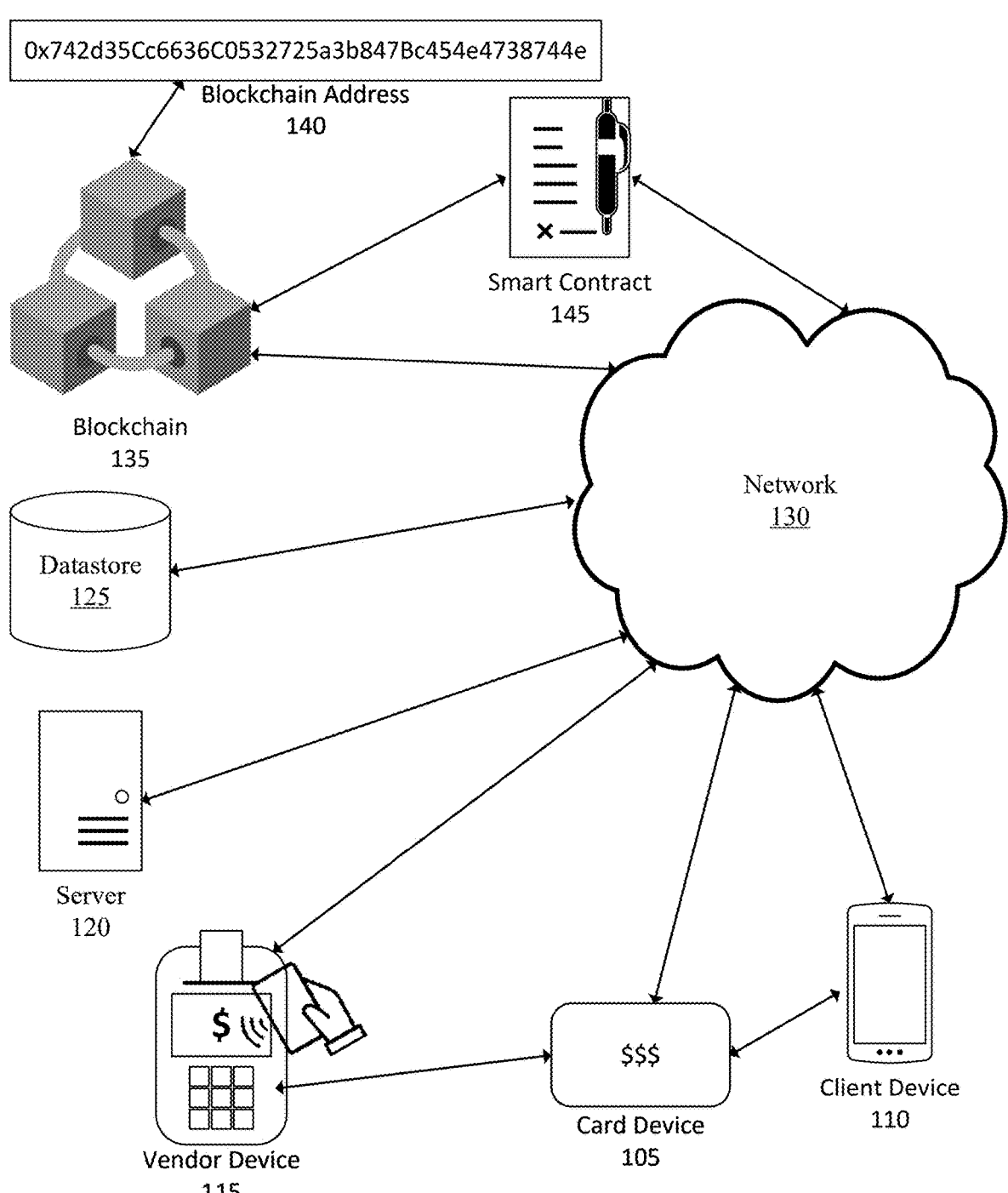
FIG. 1 is a diagram illustrating an exemplary digital currency platform ecosystem in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system and methods for managing secure cryptocurrency or digital currency devices that mimics traditional open loop gift card aesthetics and capabilities, with significant additional capabilities that give them the benefits of cash while still being able to store and receive varying amounts of funds in a single physical instance.

In some embodiments, the secure cryptocurrency or digital currency devices may be referred to as a card, gift card, card device, device or hardware wallet. The card device may be configured to self-generate at least one asymmetric keypair, wherein the keypairs may be ECDSA or EdDSA keypairs across various fields, such as those typically used in blockchain applications like secp256k1, Ed25519 P256, babyJubJub.

In some embodiments, the keypair generation scheme may not be categorized as asymmetric whereby a blockchain or zero knowledge system is able to authenticate a message that intends to transfer or receive funds or transfer/receive any other generic message.

In some embodiments, the device may not generate an asymmetric key pair but rather is used in a symmetric scheme, instead presented encrypted messages to a trusted server that in turn signs messages on behalf of the device, representing it with a blockchain compatible address.

In some embodiments, the card devices may be communicated wirelessly, through protocols like NFC, RFID or Bluetooth. The card devices may directly communicate with one or more client devices and/or one or more vendor devices, such as a point of sale systems. In some embodiments the card devices may communicate with each other. The card device may use existing RFID or smart card communication standards like ISO 14443, ISO 7816, ISO 15693, ISO 18000 or other proprietary communication standards.

In some embodiments, the card device communication may be completely passive, e.g., whereby all power is induced via an NFC or RFID reader. In some embodiments, the card device may be configured to communicate with through physical contacts (e.g., like the "chip" on smart cards or credit cards). The card device may use existing payments standards for communication like ISO 8583, ISO 20022, or other proprietary payment standards.

In some embodiments, the card device may be configured to secure keypairs such that it is never extractable from the device. In some embodiments, it may only be transmitted to another device of the same kind (e.g., made by the same manufacturer).

In some embodiments, the "source" card device may establish that the other ("target") card device is authentic by verifying, on the target card device, that an identifier has been signed by a manufacturer's private key, creating a signature or "certificate."

In some embodiments, the target card device may also verify/authenticate an identifier on the source card device through a cryptographic signature or certificate. The source card device may then negotiate a secure channel with the target card device. In some embodiments, a pre-shared key from the factory known to both devices may be used.

In some embodiments, the card devices may use a scheme like ECDH to derive or create a shared secret. The shared secret may be derived using information shared in the previous authentication steps.

In some embodiments, the keypair may be requested to sign a signature openly without any further authentication. Smart contracts in the gift card payment system (digital currency payment system) may regulate what messages ("digests") that are to be signed by the devices are considered valid, thus any errant signature that is "stolen" from a device does not matter since it does not indicate payment to a permissioned vendor. The vendor may create a deposit/bond/escrow on chain in the smart contract such that false charges may be disputed.

In some embodiments, the open signing of the signature without any further authentication may be requested when it is outside a specific time window, it is spending an amount that is too high, or of the wrong currency, or a combination of all of the above. It is one factor in conjunction with other factors, e.g., another signature provided by another device or an out of bounds PIN code/passphrase that is interpreted by a smart contract.

In some embodiments, one or more PIN codes or passphrases may be required. The PIN code may be a passphrase that is first hashed into a fixed length. The hashing process may include additional salts or information in order to obscure an otherwise short ciphertext. In some embodiments, entering too many (predetermined threshold) incorrect PIN codes or passphrases may lock the device permanently. A counter may be used to track the number of unsuccessful PIN code/passphrase entries. A correct entry prior to unlocking may reset this counter.

In some embodiments, one or more signatures may be required from a known public key that has been recorded or stored within the device This signature may originate not only from an asymmetric process, but it might also originate from a threshold signature scheme such that only N parties out of a larger set must participate in generating the signature that then enables the device to generate a signature. For example, a payment network where three entities, a bank, a payment processor and the vendor generate a signature, although there are many other banks and payment processors who could have generated a valid signature.

In some embodiments, the card device may be the size of a typical credit card and configured to fit within existing payment terminal, ATM and "credit card-sized" slots.

In some embodiments, the card device may or may not include a printed denomination that approximates "open loop" gift cards from existing payment networks in visual appearance.

In some embodiments the card device may also include functionality to work within a traditional payment network, including but not limited to Visa®, MasterCard®, American Express® and Diners Club®. The card may include an associated prepaid account, debit account, credit account, bank account or other institutional account. This account may be loaded one or more times, possibly on a recurring basis, from any wallet associated with the device. The traditional payment card would function through traditional payment methods such as, but not limited to, those specified by the EMV standard, ISO 8583, ISO 20022. In one non-limiting example the loading process from wallet to traditional payment functionality may trade, mediate, bridge, distribute or transmit any token, cryptocurrency or stablecoin to a financial institution for further storage, credit or payment through the traditional payment portion of the card.

In some embodiments, the card device may establish a secure channel with other card devices, either directly or indirectly, in order to send key material in an offline fashion. This key material may be used to generate payments/transactions. Offline transfer of key material may be performed in a similar way as described above regarding transferring between a source card device and a target card device.

In some embodiments, the source card device and target card device may be configured to confirm transmission and receipt of the key material such that they ensure that the source car device deletes the key material in a non-recoverable fashion and the target card device is the only device that remains with the key material.

In some embodiments, a transfer and/or duplication counter may be incremented for transfer functions. In some embodiments, a transfer may be required to occur within a predetermined number of attempts or a key slot may be permanently locked. This may prevent certain attack vectors where something is using these features in order to try and extract a key from the device.

In some embodiments, transfer of key material may be allowed to a device that is not of the same kind but still goes through a similar authentication process. Funds may be sent offline from a gift card (source, trusted) to a specialized trusted payment terminal to approximate a cash transaction.

In some embodiments, these features may be used in conjunction with a smart contract on the blockchain such that funds are locked for a certain set of non-limiting conditions such as locking funds for a period of time, locking funds for a second factor to allow transfer, locking funds in a smart contract wallet whereby any number of rules can be programmatically applied in a standardized fashion (e.g. considering the Ethereum smart contract wallet or account abstraction standard ERC-4337) and locking funds in a smart contract that specifically denominates certain amounts and kinds of cryptocurrencies, wherein those cryptocurrencies may have special features that antici-pate usage within a system as described herein.

In some embodiments, the smart contract information of locked funds may be compressed and stored easily in an offline fashion such that clients (e.g. smartphones) interact-ing with card devices in an offline scenario would only need to store a limited amount of information prior to interacting with said card devices in order to verify them where there is no connectivity to a blockchain. This critical feature ensures that you can transfer funds in an offline fashion. If you merely hand a key from one card device to another, the source card device may have first taken a signature from the key which they store offline and only later replay once online (before the holder of the target card device can take action). Without this feature, a person might "spend" funds from the source device while still handing the key over.

In some embodiments, the card devices may be "loaded" with funds through a specialized hardware device/vendor device ("specialized POS or Point of Sale") that may carry out several functions. The vendor device may be configured to scan card devices in order to capture the public key information of the private key associated with the card device or the smart contract address information associated with the card device. In some embodiments, the vendor device may need to capture a signature from the card device in order to ensure that it is present. The vendor device may be configured to send a command or series of commands to the card device in order to generate key material within the card device that then may be used to send funds or to place the card device into an activated mode such that it can receive funds. Said commands may contain a signature from an activation service or entity or a series of signatures in a threshold signature scheme.

In some embodiments, activation of the card device may require scratching off a part of the card device to reveal a code that is used to activate a function on the device. In some embodiments, one or more activation methods may be used to ensure (1) cards that are stolen but unloaded cannot be used (2) the correct card is being loaded vs. someone replacing cards on the shelves or modifying things like barcodes or QR codes so that loaded funds are sent to the wrong destination.

In some embodiments, KYC ("know your customer") checks may be performed at the vendor device. The KYC checks may be required before accepting funds from a customer/user and subsequent loading of the accepted funds.

In some embodiments, funds may be received from a traditional payment rail, such as but not limited to credit cards, debit cards, prepaid instruments, cash, check, ACH, wire, etc.

In some embodiments, the acceptance of funds may be signaled to a clearinghouse. A clearinghouse may be a financial institution, money services business, bank or oth-erwise certified business depending on jurisdiction and local money transmission requirements. Digital money and/or cryptocurrency corresponding to the amount of funds received may then be transferred, possibly with a fee deducted or a bonus added, to the card device in order to complete the load.

In some embodiments, the card device may be "pre-loaded" with funds. In this embodiment, the card device may have an associated smart contract which is pre-loaded with funds that correspond to the denomination printed on the card device. The smart contract may be controlled by one or more other entities through additional means such as public/private key pairs. The private key material on the card device can be used to verify the authenticity of the device and that it may, after activation, access funds. This can be done by identifying the smart contract and ensuring that the public key of the device is stored in said smart contract in such a fashion that it is known that key may access the funds given certain conditions.

In some embodiments, the smart contract may keep the funds in an escrowed state such that the vendor or other parties with access to the smart contract are unable to retrieve funds unless a certain set of conditions are fulfilled, e.g. after a specific amount of time (and only if the associated device has not been activated). In some embodiments the smart contract that escrows funds based on a set of predetermined conditions or mutable conditions may be represented by a non-fungible token or NFT (e.g. Ethereum standard EIP-721) or semi-fungible token (e.g. Ethereum standard EIP-1155).

In some embodiments, only on receipt of funds by the vendor (sale of the device) are these other entities removed from the smart contract and the device "activated" to spend the funds solely. In some embodiments this activation fea-ture may be a physical electrical feature on the device itself, a hardcoded function (sometimes referred to as a "fuse") or a function added in firmware. For example, there may be markets where vendors are low trust and as such customers wish to first validate that the digital funds are available directly to the device prior to giving any funds to the vendor. This embodiment allows a potential purchaser to scan a card first to authenticate it (through the packaging) and verify that funds are available in a digital form for immediate release. In some embodiments you may not be able to scan a device through the packaging until the packaging is tampered, altered or removed. In some embodiments only a high powered scanner may interact with the device through the packaging, such as a point of sale terminal or other high powered NFC scanner while a smartphone may not scan a device through the packaging.

In some embodiments, there may be a scratch off PIN/passcode for the end user which restricts usage of the card device until reveal. This is a unique advantage over existing gift cards as this device may be sealed in such a way that it can still be read over NFC/RFID in order to get a signature to activate or authenticate the card during the loading process BUT it cannot be spent until physically removed from the sealed package and the number is scratched off. This additional tamper step allows a recipient to have greater confidence that they are receiving a loaded card, notably when it is gifted to someone else.

In any embodiment the card device may act as a full hardware wallet, being capable of sending/managing digital money or cryptocurrency of digital funds directly to any other address, as allowed by a blockchain system. In one embodiment the stored cryptocurrency or digital currency is a "stablecoin," "flatcoin" or "CBDC," wherein the stablecoin may be 1-1 backed with a fiat currency (e.g., US Dollars) or algorithmically pegged or pegged by another means not described. The stablecoin system may be managed as a part of the digital currency management system by a single entity or multiple entities in a network, and yields accruing to the entity(s). In some embodiments yields may be shared from the stablecoin system to any participants in the system including but not limited to banks, issuers, device manufacturers, vendors, retailers, end users, users loading funds on behalf of other users, distributors or affiliates. The stablecoin may have features such that it may be spent by one party on behalf of another. This may allow a third party to subsidize the gas or transaction costs on a blockchain entirely so that the user/holder of the device does not need to pay gas.

In some embodiments, the creator of the stablecoin, participants in the payment network, the vendor or other non-limiting third parties may subsidize blockchain fees associated with the stablecoin through various mechanisms including but not limited to: Sending a small amount of native "gas" token or funds to the payer (card device) associated account or smart contract in order to execute the transaction; Obtaining signatures from the card device which in turn it or another third party relays to the stablecoin smart contract, paying any associated blockchain transaction fees; Being party to an account abstraction scheme associated with the card device such that the third party has a key or special function within the account abstraction scheme that allows it to broadcast transactions that have the same effect as the card device directly broadcasting said transactions.

In some embodiments, the card device may be reloaded either in the same fashion as the original load, e.g., with KYC via a vendor, or digitally through the blockchain. In the blockchain reload scenario, there is no need for any intermediary or verification; such reloading is not permissioned and gives significant utility to the device after initial funds have been spent.

In some embodiments, the card device may be reloaded with the same or different cryptocurrency or digital money than what was originally loaded. In some embodiments, funds may be sent directly to a bank account. For sending funds directly to a bank account certain KYC tasks may need to be completed. The funds may be sent to a bank account rather than spent through a credit card network as is required with most open loop gift card systems.

In some embodiments, fees inherent to the card device acting as a gift card may be transparent to the user due to the blockchain nature of the funds. The fees may be levied on any functions of the card device through a smart contract and, given a stablecoin managed by an entity or network of entities with functions that allow for the collection of fees.

In some embodiments, the fees may be redistributed in a transparent manner to partners in the network, vendors and/or the end holders of devices.

In one embodiment where a single "tap" of the card device configured to receive and send RFID or NFC messages may be sufficient to send a command or digest that includes information about a destination recipient, said recipient being an individual, financial institution, vendor or other payee. The single "tap" may also be sufficient to command or digest, also including authentication information if required, for the specific key on the device to authenticate. The card device may also respond with a cryptographic signature or message, said signature intended for broadcast to a blockchain in order to directly carry out a financial transaction or a message intended for an intermediary who in turn broadcast the transaction, possibly subsidizing any blockchain costs or using a portion of the funds being sent to subsidize blockchain costs.

At the blockchain, receiving the transaction either directly from the holder of the card device through their client device or from the intermediary, to either transmit funds directly from a blockchain account associated with the cryptographic key material stored on the card device or indirectly through a smart contract associated with the cryptographic key material stored on the card device (possibly referred to as an "account abstraction" scheme).

In some embodiments, the card device may incorporate counters such that any time a signature or other cryptographic message is generated the counter increments. In some embodiments, the card device may incorporate an internal hashing mechanism whereby each subsequent digest signed is hashed with another hash internally stored, the other internally stored hash containing all previous hashes of hashes. This allows one to reveal the history of a signing device to any subsequent holder to prove that they did or did not sign additional messages that may be broadcast at a later time. So, in essence, one could prove that a device has not signed a message which may drain the funds of a device at a later date in time.

In some embodiments, the functions of the card device, apart from those related to loading which may use a point of sale terminal, may be accessible in part or in full entirely through a web browser on an NFC or RFID enabled client device without the need for a dedicated application to be installed on said client device, but rather only minimum compatibility with standards like WebAuth, WebNFC, WebUSB, WebHID, WebBluetooth the credential API and/or hardware passkeys Such functions including but not limited to allowing the holder of the device to view the balance, view an associated blockchain address to reload funds, create any blockchain transactions, create any cryptographic signatures, add or update PIN codes or passphrases, allow or disallow usage at certain vendors, disable the device, backup the card device to target card devices, send keys offline to target card devices, carry out any other possible or feasible hardware wallet functions. Said functions and interfaces may be openly accessible so that the termination of any one vendor making or offering said card device would not preclude access to functions that allow for any other third party to interface with such functions. For example, most hardware wallets rely on clients and software that must be maintained by the creators or those devices might become inaccessible. In some embodiments, a simple open source library may be provided that subsequently allows for unbounded access by clients not developed by the original vendor. Likewise, by not relying on client apps, no approval needs to be sought (e.g., from app marketplaces to deploy an app) to use the device with a standard smartphone. Ultimately these are added to make the ability to use the device more "cash like" as opposed to gated by third party vendors.

In another embodiment, the client device, point of sale system, vendor device or any second communicating device may establish a secure channel with the card device. The establishment of the secure channel may involve a pre-shared key, a key known to the card device or a key derived through a process like ECDH. In some embodiments, this channel may be required for all communications with the device, or only a subset of commands such as but not limited to sensitive ones like passcode rotation or signature generation.

In another embodiment, the point of sale system or vendor device may also be compatible with virtual representations of the card device which do not have all of the same cryptographic features but allow for spending of funds in a similar fashion as the card. For example, a card device (gift card) may be "loaded into" a wallet application on a client device (smartphone).

In this embodiment, the cryptographic material backing a specific smart contract or set of funds may be encrypted on the device and sent on to a further server; the encryption scheme may be designed as such that any device in the system can decrypt the key material.

In some embodiments, the material may not be encrypted as it is presumed that transport encryption, including HTTPS and NFC connections, protect the material and the key material is treated as having a "disposable" role. The server may then package the encrypted key material along with metadata for the creation of a "virtual" gift card device.

Further, the server may send this virtual card device to a client device through one or more digital wallet schemes. The client device may allow for sending of this encrypted key material from device to device like a bearer instrument, the metadata allowing the holder to verify funds associated.

In some embodiments, a vendor device or an adapted point of sale system may be able to, with a matching vendor target device of its own embedded within it or communicating with a cloud target device: Calculate an amount to be spend from the virtual card device (e.g. a purchase of item(s)); Present the amount to be spent to the user (e.g. on a payment register screen); Have the user tap the client device with the embedded virtual card device, and in doing so relay the embedded virtual card device to the embedded or cloud target device; Decrypt the virtual card device in the vendor target device, derive the blockchain key material, create a transaction and spend the amount to be sent; Delete all key material from the vendor target device; And additionally inform another server, such as those associated with a payment network/digital wallet, that the balance of the virtual card device as revealed in the client should be updated.

Furthermore, if this key is treated as disposable, it may be instead involved in an account abstraction or smart contract scheme whereby: The smart contract may be associated with the disposable virtual card device key material as a unique role with additional spending limits not limited too but possibly including a plurality of the amount, what blockchain address(es) funds may be sent to, when funds may be spent and a dynamic consideration of all of the above. For instance, if X funds have been spent before Y date, only Z funds may be spent to a subset of ABC addresses.

In some embodiments, the disposable key may add a certified and authenticated real device back into the smart contract (where the smart contract validates signatures attesting to the authenticity of the device and its keys), said device regaining full unfettered control of the funds and capable of removing the disposable key from the smart contract after addition.

FIG. 1 is a diagram illustrating an exemplary digital currency platform ecosystem 100 in which some embodiments may operate.

The digital currency platform ecosystem 100 may comprise one or more card devices 105, one or more client devices, 110, one or more vendor devices 115, one or more servers, one or more datastores 125, a network 130, blockchain 135, blockchain address 140 and smart contract 145.

The one or more card devices 105 may be physical "cryptographic card" or "crypto gift card. In some embodiments, the card device may be a hardware crypto wallet. In some embodiments, that card device 105 may be configured to self-generate at least one asymmetric keypair. The keypairs may be ECDSA (Elliptic Curve Digital Signature Algorithm) keypairs across various fields, such as those typically used in blockchain applications like secp256k1, P256, babyJubJub or EdDSA (Edwards-curve Digital Signature Algorithm) such as Ed25519. In some embodiments the keypairs may be generated through a scheme not categorized as asymmetric whereby a blockchain or zero knowledge system is able to authenticate a message that intends to transfer or receive funds or transfer/receive any other generic message.

In some embodiments, the device may not generate an asymmetric key pair but rather is used in a symmetric scheme, instead presenting encrypted messages to a trusted server that in turn signs messages on behalf of the device, representing it with a blockchain compatible address.

In some embodiments, the card devices 105 may be the size of a typical credit card. The card devices 105 may conform to specifications like CR79 or CR80 such that it fits within existing payment terminal, ATM and "credit card-sized" slots.

The client devices 110 may be one or more physical or virtual machines configured to communicate with the one or more card devices 105, one or more vendor devices 115, one or more servers 120, one or more datastores 125, the blockchain 135, blockchain addresses 140 and smart contracts 145 over network 130. In some embodiments, the client device may be configured to directly communicate with the card devices 105 and/or vendor devices 115 directly. Direct communication may be performed wirelessly, through protocols like NFC, RFID or Bluetooth.

The one or more vendor devices 115 may be configured as a point of sale device or payment terminal. The vendor devices 115 may be configured to establish a secure channel with the one or more card devices 105 and/or the one or more client devices 110. The vendor devices 415 may further communicate with the client devices 110, the one or more servers 120, one or more datastores 125, the blockchain 135, blockchain addresses 140 and smart contracts 145 over network 130.

The servers 120 may be one or more physical or virtual machines configured to communicate with the one or more card devices 105, one or more client devices 110, one or more vendor device 115, one or more datastores 125, the blockchain 135, blockchain addresses 140 and smart contracts 145. The one or more servers 120 may be configured as a distributed computing infrastructure.

Datastores 125 may communicate with one another over network 130. Datastores 125 may be any storage device capable of storing data for processing or as a result of processing information at the card devices 105, client devices 110, vendor devices 115, and/or servers 120, the blockchain 135, blockchain addresses 140 and/or smart contracts 145. The datastores 125 may be a separate device or the same device as server 120. The datastores 125 may be located in the same location as that of servers 120, or at separate locations.

Network 130 may be an intranet, internet, mesh, LTE, GSM, peer-to-peer or other communication network that allows the one or more client devices 110, vendor devices 115, servers 120, datastores 125, the blockchain 135, blockchain addresses 140 and smart contracts 145 to communicate with one another.

Blockchain 135 may be any distributed ledger, directed acyclic graph, digital shared consensus transaction system, or database shared across a network of nodes.

Blockchain addresses 140 may be any unique identifier in the blockchain 135.

Smart contracts 145 may be configured to gate one or more factors. In some embodiments, the smart contract may be configured to control factors such as when funds can be spent from a contract.

In some embodiments, the smart contract may be configured to set limits of spending funds; either universally or based on vendors or categories of vendors (e.g., how they are rated, what industry they sell in).

In some embodiments, the smart contract may be configured to control a combination of the two factors above (spend $10 per day).

In some embodiments, the smart contract may be configured to automatically convert from a stablecoin in the smart contract to another stablecoin or cryptocurrency on every spend.

In some embodiments, the smart contract may be configured to perform additional KYC or other regulatory looks/checks upon spend. For example, additional checks may be performed to guarantee that funds are not accidentally sent to a sanctioned person or entity based on another smart contract list.

In some embodiments, the smart contract may be configured to perform bridging by automatically sending funds to another blockchain on spend. For example, a user may have a stablecoin on Ethereum, but the vendor wants funds on Solana, the smart contract may automatically perform the bridging from one fund to the other.

In some embodiments, the smart contract may be configured to require a plurality of signers to interact with the smart contract (or outside factors by other "oracles", e.g., verify a SMS that is brought on chain by an oracle and confirms a spend request with the smart contract).

In some embodiments, the smart contract may be configured to use the smart contract to verify from a second smart contract where funds may be spent to (e.g., only a certain set of addresses representing a subset of vendors).

Figure 2A:
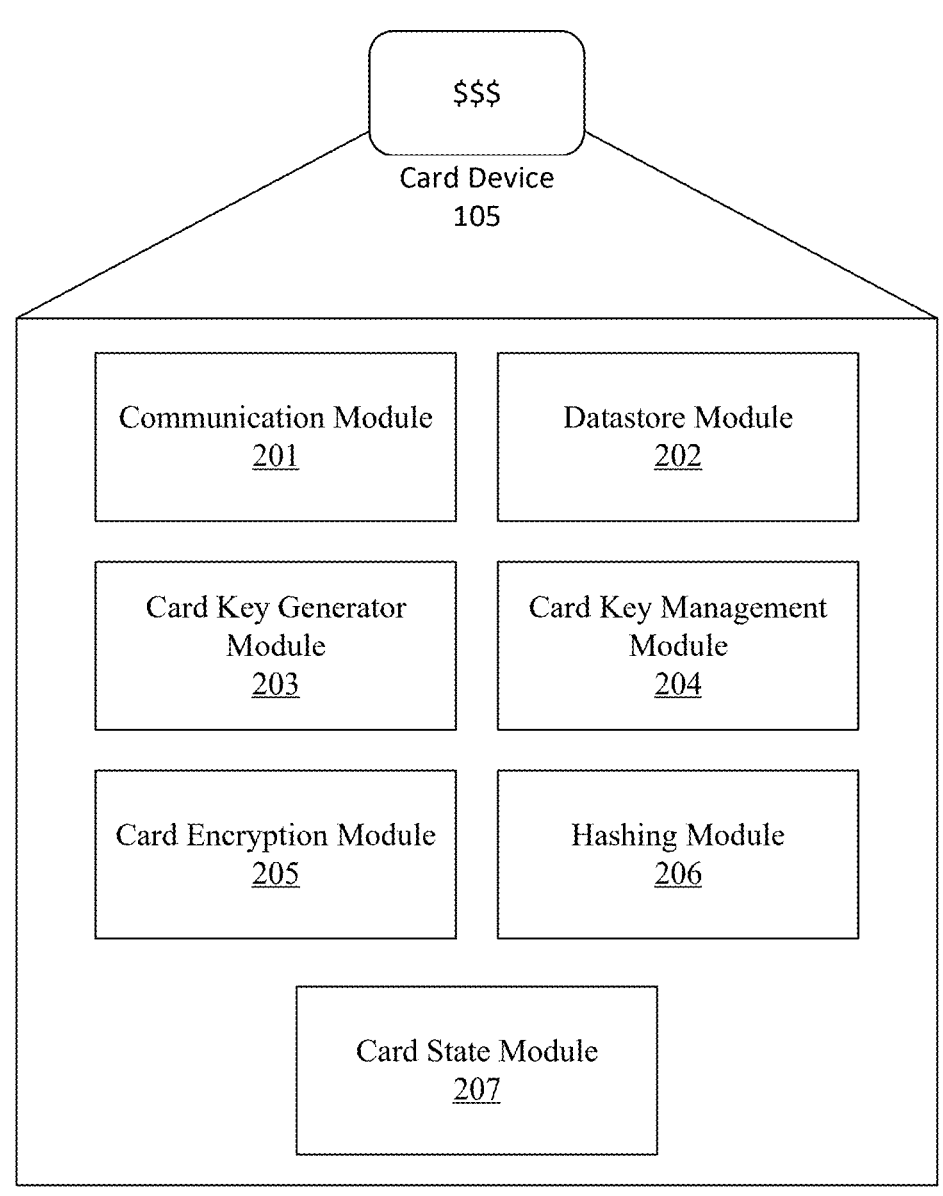
FIG. 2A is a diagram illustrating an exemplary physical digital currency device in accordance with aspects of the present disclosure.

FIG. 2A is a diagram illustrating an exemplary physical digital currency device ("card device") 105 in accordance with aspects of the present disclosure. The card device 105 may comprise a communication module 201, a datastore module 202, a card key generator module 203, a card key management module 204, a card encryption module 205, a hashing module 206 and a card state module 207.

Communication module 201 may be configured to communicate wirelessly, through protocols like NFC, RFID or Bluetooth. In some embodiments, the communication module 201 may be completely passive, e.g., whereby all power is induced via an NFC or RFID reader. Data received by the communication module 201 may be used by the other modules. The modules may transmit data through the communication module 201.

The datastore module 202 may be configured to store information generated by the one or more modules operating on the card device 105. The one or more modules operating on card device 105 may also retrieve information from the datastore module 202. Datastore module 202 may also be configured to receive and store information received over communication module 201.

The card key generator module 203 may be configured to generate its own key material or subsequently generate key material on command by the request of a user. In some embodiments, the card key generator module 203 may use a symmetric-key algorithm such as DES and AES, and/or an asymmetric/public-key algorithm such as RSA. In some embodiments, card key generator module 203 may also use ECDSA, EdDSA or other signature algorithms to generate keypairs. Other key generation algorithms may also be implemented by the card key generator module 203.

The card key management module 204 may be configured to manage one or more keys generated by the card key generator module 203, or keys received over communication module 201.

In some embodiments, card key management module 204 may be configured to receive and store a PIN code or password used in the authentication/authorization of the card device. Authentication/authorization may be required for transactions to be initiated or completed.

In some embodiments, the card key management module 204 may also be configured to track the number of failed PIN code or password authentication attempts. The card management module 204 may freeze/lock some or all of the functionality of the card when a predetermined number of failed attempts is reached. The freezing of functionality may be permanent, for a predetermined amount of time, or until a recognized device unfreezes/unlocks the card device.

The card encryption module 205 may be configured to use the key or keys generated by the card key generator module 203 to encrypt any information sent over communication module 201. The card encryption module 205 may also use said key/keys to decrypt information received over communication module 201. In some embodiments, the card encryption module 205 may be configured to use the key/keys generated by the card key generator module 203 to encrypt some or all of the information stored on the card device.

The hashing module 206 may be configured to hash each digest signed. In some embodiments, each subsequent digest signed may be hashed with another hash internally stored, wherein the other internally stored hash contains all previous hashes of hashes. This allows one to reveal the history of a signing device to any subsequent holder to prove that they did or did not sign additional messages that may be broadcast at a later time.

The card state module 207 may be configured to track whether or not the key has been duplicated, how many times it has been duplicated, whether or not the card originated the key or merely holds a duplicate and whether or not the card both was a copy of the original and then further on served as a source to another card.

Figure 2B:
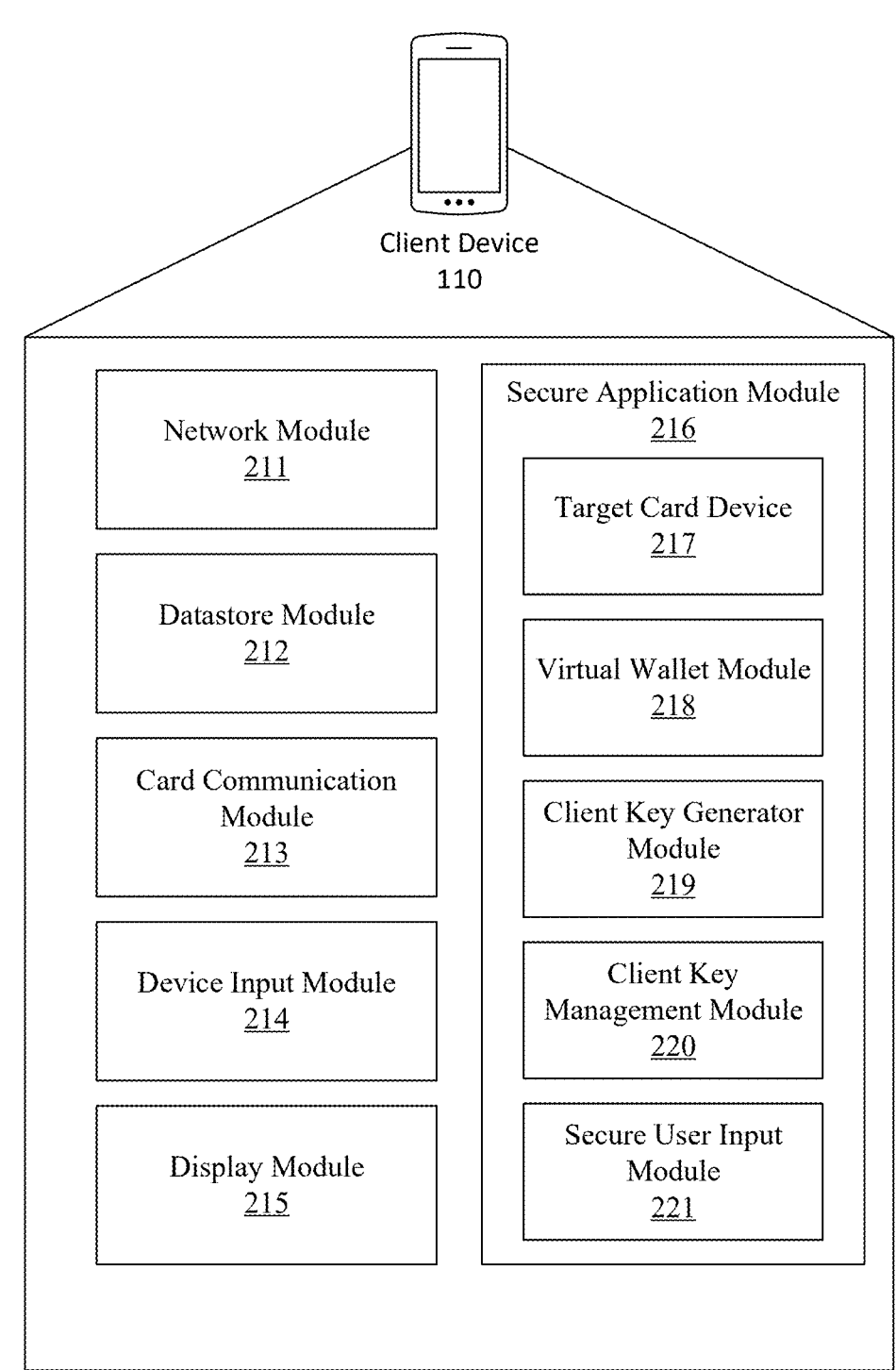
FIG. 2B is a diagram illustrating an exemplary client device in accordance with aspects of the present disclosure.

FIG. 2B is a diagram illustrating an exemplary client device 110 in accordance with aspects of the present disclosure. Client device 110 may comprise a network module 221, a datastore module 212, a card communication module 213, a device input module 214, a display module 215, a secure application module 216, a target card device 217, a virtual wallet module 218, a client key generator module 219, a client key management module 220 and a secure user input module 221.

Network module 211 may transmit and receive data from other computing systems via a network such as network 130 as described above with regard to FIG. 1. In some embodiments, the network module 211 may enable transmitting and receiving data from the Internet. Data received by the network module 211 may be used by the other modules. The modules may transmit data through the network module 211.

The datastore module 212 may be configured to store information generated by the one or more modules operating on the client device 110. The one or more modules operating on the client device 110 may also retrieve information from the datastore module 212. Datastore module 212 may also be configured to receive and store information received over network module 211.

The card communication module 213 may be the same or similar to that of communication module 201 of FIG. 2A. The card communication module 213 may be configured to read and transmit information from/to card device 105 and vendor device 115. In some embodiments, card communication module 213 may include NFC, RFID, smart card reader, Bluetooth, WiFi, infrared, camera, USB and/or PCI devices.

The device input module 214 may be configured to receive input from the user. Input may include keyboard, PIN code entry, number pad, touchscreen, touch, gesture, mouse, microphones, sensor, toggle switches, fingerprint, retina scan, EKG, face scan, palm scanner, vein scan, voice authentication, gesture, any biometric not otherwise named, or any other input device or combination thereof.

The display module 215 may include smartphone displays, monitors, multi-line display, e-paper, e-ink, printed material, printed receipt, point of sale display, PIN pad display or combination thereof. In some embodiments, the display module 215 may be any screen or graphical display device such as LCD, TFT, OLED, LED, IPS, QLED, AMOLED or similar display devices. In some embodiments, the display device 215 may be a touchscreen display and used by the device input module 214 to receive user interactions.

The secure application module 216 may be configured to operate as a secure processing environment on the device, wherein the modules within the secure application module 216 are isolated from the main device modules/systems. In some embodiments, only authorized modules may communicate with one another, access data and store data operating within the secure application module 216.

In some embodiments, the secure application module 216 may include secure progressive web application, application distributed through Apple® App Store™ or Google Play™ store, application with access to secure element, application or applet stored within SIM or eSIM, stored within HSM, stored within secure memory, designed to be executed on secure architecture like ARM® TrustZone™, Intel® SGX™, AMD® SEV™

The target card device 217 may comprise the same modules as card device 105. These modules operate in the same manner.

The virtual wallet module 218 may be configured to store one or more virtual card devices or copies of real card devices. In some embodiments, virtual wallet module 218 may include Apple Wallet™, Apple Passes™, Apple Passbook™, Google Wallet™, Google Wallet™ Passes, encrypted private keys, .dat files, json files, .txt files, .key files, .xke files, .gpg files.

The client key generator module 219 and client key management module 220 may be the same or similar to that of card key generator module 203 and card key management module 204 as described in FIG. 2A. The modules may operate the same as those in FIG. 2A, as well as maintain keys and data corresponding to a plurality of keys. For example, the client key generator module 219 and client key management module 220 may generate one or more keys for each of a plurality of card devices as well as store PIN codes/passwords for each other plurality of card devices. The information stored in the card state module 207 of each of the plurality of card devices may also be stored in the client key management module 220.

In some embodiments, the client key management module 220 may include storage of private key material, symmetric and asymmetric, PIN code, passphrases, passwords, one time signatures or combination thereof.

The secure user input module 221 may be configured to receive input through the same hardware used by device input module 214. The input may be encrypted before being stored or transmitted.

Figure 2C:
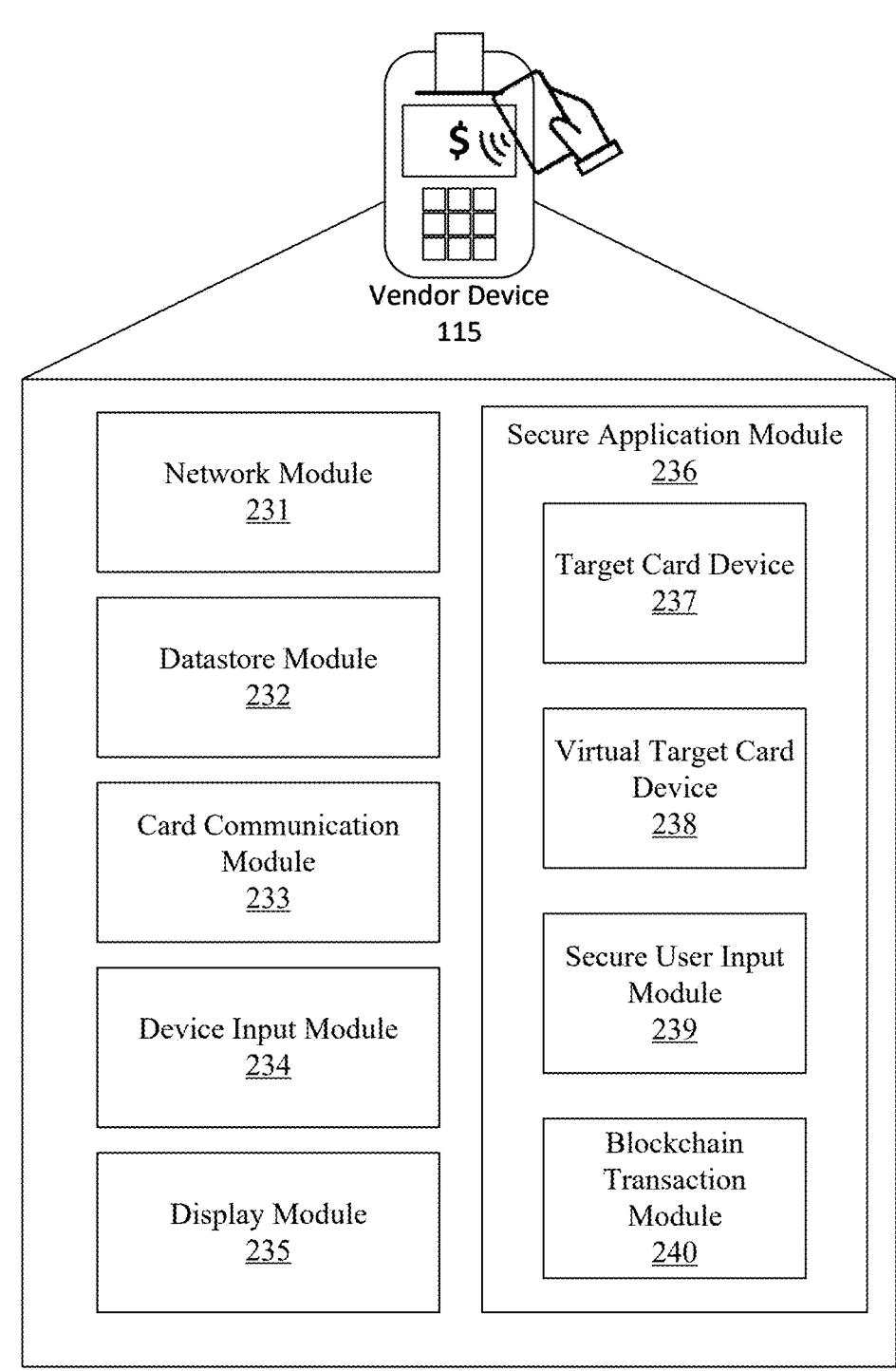
FIG. 2C is a diagram illustrating an exemplary vendor point of sale terminal in accordance with aspects of the present disclosure.

FIG. 2C is a diagram illustrating an exemplary vendor device 115 in accordance with aspects of the present disclosure. Vendor device 115 may comprise a network module 231, a datastore module 232, a card communication module 233, a device input module 234, a display module 235, a secure application module 236, a target card device 237, a virtual target card device 238, a secure user input module 239 and a blockchain transaction module 240.

Network module 221 and datastore module 222 may be the same or similar to that of network module 211 and datastore module 212 as described above with regard to FIG. 2B.

Card Communication Module 233 may be the same or similar to that of communication module 201 of FIG. 2A and card communication module 213 of FIG. 2A. The card communication module 233 may be configured to read and transmit information from/to card device 105 and client device 110.

Device Input Module 234, display module 235, secure application module 236 and secure input module 239 may be the same or similar to that of device input module 214, display module 215, secure application module 216 and secure input module 221 of FIG. 2B and operate in the same manner and will not be described in detail for the sake of brevity.

Target Card Device 237 may comprise a physical card device or the hardware/software of the physical card device and function in the same manner as the physical card device 105.

Virtual Target Card Device 238 may be a virtual copy of target card device 237 and be used alone or in combination with target card device 237. In some embodiments, the virtual target card device 238 may be implemented with a combination of hardware within the vendor device 115 and software/modules configured to emulate the operation of card device 105.

Blockchain Transaction Module 240 may be configured to initiate a transaction, finalize a transaction or perfume one or more intermediate actions during a transaction. Transactions may be between a card device of the user or virtual wallet of the user. The transactions may include transferring of digital currency between blockchain addresses of users and the vendor/merchant. In some embodiments, the blockchain transaction module 240 may be configured to facilitate execution of smart contracts. In some embodiments, the blockchain transaction module 240 may include application, software or algorithms designed to create signatures, transactions, attestations or messages that are interpreted by one or more blockchains, distributed ledgers or decentralized networks for the purpose of transmitting cryptocurrencies.

Figure 2D:
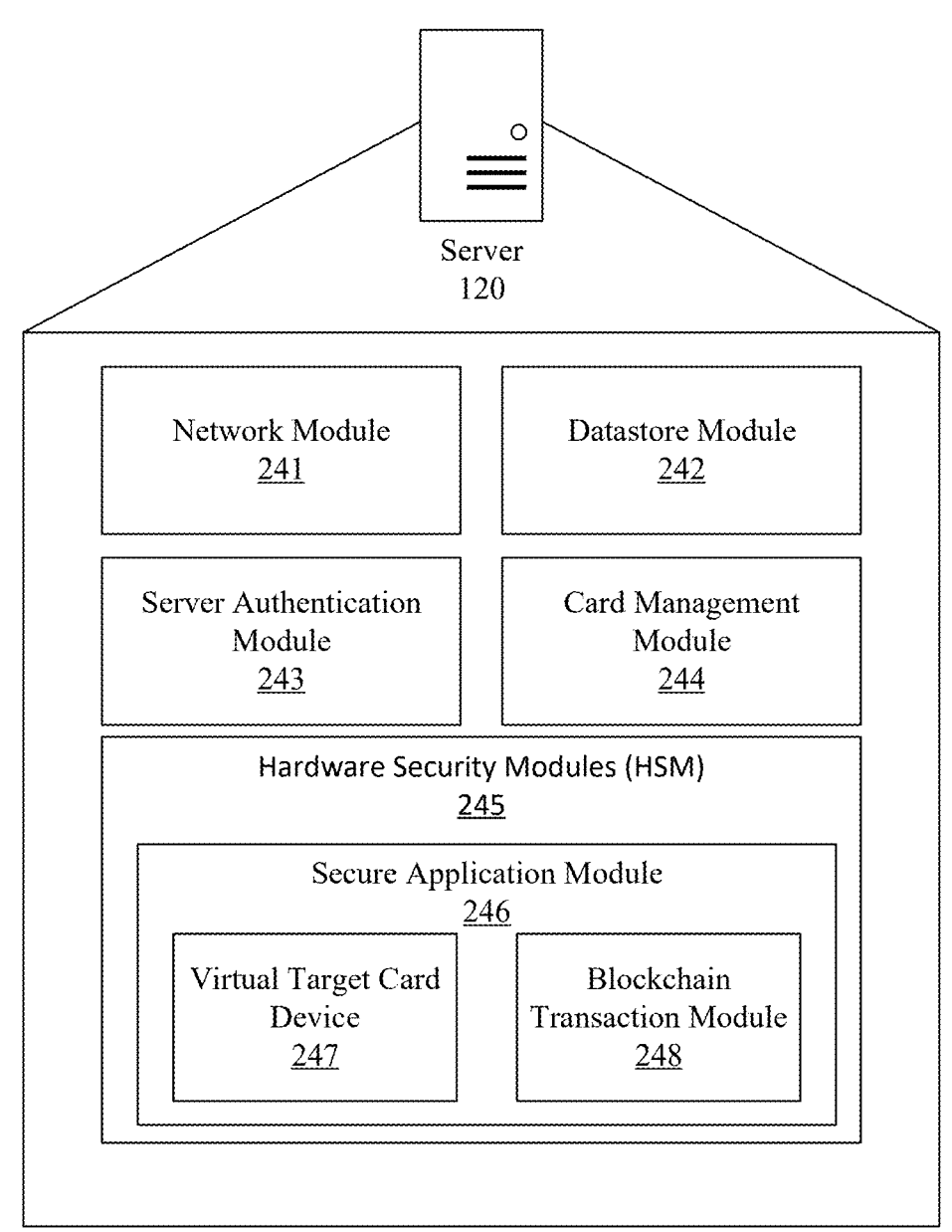
FIG. 2D is a diagram illustrating an exemplary server in accordance with aspects of the present disclosure.

FIG. 2D is a diagram illustrating an exemplary sever 120 in accordance with aspects of the present disclosure. Server 120 may comprise a network module 241, a datastore module 242, a server authentication module 243, a card management module 244, a hardware security module (HSM) 245, a secure application module 246, a virtual target card device 247 and a blockchain transaction module 248.

Network module 231, datastore module 232, secure application module 246, virtual target card device 247 and blockchain transaction module 248 may be the same or similar to that of network module 231, datastore module 232, secure application module 236, virtual target card device 238 and blockchain transaction module 240 as described above with regard to FIG. 2C and operate in the same manner and will not be described in detail for the sake of brevity.

Server Authentication Module 243 may be configured to authenticate card devices 105, client devices 110 and vendor devices 115. In some embodiments, server authentication module 243 may be configured to authenticate communications with client devices, payment terminals, point of sale devices through API keys, establishing encrypted sessions, restricting access or combination thereof.

Card Management Module 244 may be configured to store the same information as card key management module 204 and card state module 207 as described in FIG. 2A. In some embodiments, said information may be stored for each of a plurality of cards. In some embodiments, the card management module 244 may also be configured to maintain a list of activated, unactivated and deactivated cards. For example, a record of each card that has been purchased and activated may be stored as well as a record of all cards that have yet to be purchased and a record for all cards that have been deactivated. The reason and method for the deactivation may also be recorded (failed PIN/password attempts, request to freeze/lock card/lost card, etc.). In some embodiments, the card management module 244 may also store information regarding which card devices have a valid virtual card associated with them.

Hardware Security Modules (HSM) 245 may comprise one or more physical computing modules/hardware configured to manage secrets, keys, signatures and authentication and perform encryption and decryption functions. The secure application module 246 and the modules operating with the secure application module may reside within the HSM 245.

In some embodiments, virtual target card device 247 may act as a fully emulated card device as an applet or set of applets, code, and/or applications or software to be run on [Intel® SGX™/TrustZone™ etc.].

FIG. 3A is a flow chart illustrating an exemplary method for loading digital currency onto a card device 300 that may be performed in accordance with some embodiments.

At step 301, a digital currency card device may be selected by a customer.

At step 302, the customer may bring the card device to a check out terminal, point of sale (POS) device or other vendor device.

At step 303, the customer may indicate/select an amount of funds/digital currency they wish to load onto the card device. In some embodiments, the card device may be denominated.

At step 304, a "know your customer" ("KYC") check corresponding to the customer may be performed. In some embodiments, the eligibility of the customer may be checked during the KYC check. The KYC checks may be conducted as required to comply under various regimes such as but not limited to Fincen regulations around prepaid access. In some embodiments, the KYC check may be performed in a rapid fashion that approximates how a vendor might currently validate information for alcohol, tobacco, Pseudoephedrine or other age/person restricted goods.

In some embodiments, the KYC check may include manual entry of personal information like birthday, social security number, passport number, government ID number, driver's license number, name, phone number, biometric, mailing address and residence address.

In some embodiments, the KYC check may include scanning an ID to capture said personal information, e.g., a passport or driver's license, using non-limiting means such as photographic, bar code, QR code, RFID or other means. In some embodiments, this information or part of it may be used in conjunction with first or third party services that can accurately retrieve full identification information.

In some embodiments, the customer ID may also be scanned to ensure its security properties are intact and valid, such as holographic, RFID, see-through and other components.

In some embodiments, the KYC check may also include capturing of a photograph of the customer and/or using other biometrics, including a liveness check, video, fingerprints, iris checks, pulse checks or combination thereof.

In some embodiments, if a customer has previously passed a KYC check, they may only need to enter a single piece of information such as their phone number or scanning their ID again may be sufficient. If the customer passes this check, a session with the POS/vendor device may be initiated.

At step 305, the vendor device may initiate a session corresponding to the card device. The initiation may include scanning the card device. In some embodiments, the session may comprise requesting the card device sign a signature to verify its authenticity (this signature may or may not be broadcast onto the blockchain). In some embodiments, the vendor device may, either through an independent command or in conjunction with the signature, send a command that activates the card device such that it may be loaded. In some embodiments, this activation step may activate the card device by indicating that it should generate a new keypair.

In some embodiments, the vendor device may be configured to retrieve the public key information for the card device (or associated smart contract) to where funds should be sent. The public key information of the card device may be associated with the ongoing session with the vendor device.

At step 306, a payment for the selected amount of digital currency may be received from the customer at the vendor device. In some embodiments, the customer may pay via any channel available, e.g., cash, credit card, check.

In some embodiments, the customer may only be required to pay the amount that is to be loaded directly on the card. In some embodiments, the customer may be required to also pay a surcharge for the cost of the card device. This surcharge may be directed to any number of parties including the vendor, third party money services providers, etc.

At step 307, the selected amount of digital currency may be loaded onto the card device. In some embodiments, a blockchain address linked to the customer and the card device may be created as a "liquidation address." Receipt of any funds at this address may be directed to the card device. In some embodiments, the payment at step 306 may trigger settlement whereby fiat funds are received. The fiat funds may be received at a third party money services business, who in turn may send the digital currency to the liquidation address linked to the card device.

In some embodiments, digital currency may be a stablecoin, wherein the stablecoin may be backed 1-1 with fiat deposits in a traditional bank account. In some embodiments, these deposits may be placed into yield bearing assets, wherein the yield for these assets may be used to subsidize subsequent transitions using the stablecoin by the holder of the card device.

In some embodiments, the holder of the card device or customer, if completing KYC, may also directly offramp the funds to their bank account.

FIG. 3B is a flow chart illustrating an exemplary method 310 for spending digital currency that is loaded on the card device that may be performed in accordance with some embodiments.

At step 311, a first scan of a card device may be performed by a client device. The card device may hold a blockchain address associated with the card device. The blockchain address may hold a card balance corresponding to a first amount of digital currency. In some embodiments, the scanning may be performed by tapping the card device to the client device, triggering transfer of information stored on the card device.

At step 312, the customer/holder of the card may verify, in a web browser operating on the client device, the card balance.

At step 313, a transfer address corresponding to a transaction target may be received from the holder. In some embodiments, the transfer address may be a blockchain address. The address may be scanned, manually entered or pasted by the holder.

At step 314, a second scan of the card device may be performed by the client device. In some embodiments, the holder may be prompted to perform the second scan. In some embodiments, prior to the second scan, the holder may be required to enter a PIN or passcode, in the client device, which enables the transaction. In some embodiments, a physical input may be received on by the card device to enable the transaction. In some embodiments, a signature may be captured from the card device which allows for the transfer of the funds, wherein the signature authorizes a transfer of funds. In some embodiments, the first time the holder of the card device sends funds, they may be required to capture one additional signature which permits funds to be spent on their behalf, and only in conjunction with signatures allowing such a spend.

At step 315, a third party may submit a first transaction to a payment network, wherein the first transaction comprises the captured signature from the card device and a transaction amount. In some embodiments, the third party may pay any associated gas fees to the blockchain to transfer funds. In some embodiments, the third party may be earning yield from the digital currency/stablecoin. In some embodiments, such a process of subsidies may conform to Ethereum specifications around account abstraction such as EIP4337 or EIP2612.

At step 316, the first transaction may be validated based on the captured signature.

At step 317, the transaction amount is transferred to the transaction target from the card balance held at the blockchain address associated with the card device. In some embodiments, if the transaction signature is valid, a smart contract of the digital currency/stablecoin may transmit or allocate the funds to the transaction target (receiving account).

FIG. 3C is a flow chart illustrating an exemplary method 320 for offline transferring of digital currency from card device to card device that may be performed in accordance with some embodiments. To transfer digital currency in an offline manner, the user may need to possess both a source card device and a target card device. The source card device may be loaded with digital currency, and the target card device may be any other card device (loaded or empty). In some embodiments, the target car device may or may not have been previously used to store funds. In some embodiments, the loaded source card device may include funds locked in a smart contract.

At step 321, a first scan may be performed by a client device. The first scan may comprise reading information from a source card device. In some embodiments, the reading may be initiated by tapping the source card device on or near the client device.

At step 322, a transfer state of the source card device and the client device is verified. The transfer state corresponding to the source card device and the client device being allowed to transfer funds. In some embodiments, the verification may comprise receiving a correct PIN code or passphrase.

At step 323, a second scan may be performed by the client device. The second scan may comprise reading information from a target card device.

At step 324, a receive state of the target card device may be verified based on the second scan. The receive state may correspond to the target card device being allowed to receive funds. In some embodiments, the receive state may indicate the ability to receive funds via cryptographic key material as opposed to blockchain transfer, although this is not mutually exclusive.

At step 325, authenticity of the source card device and the target card device may be verified. Verification may be based on information collected during the first scan and the second scan or subsequent scans of the source card device and the target card device. The authentication of both card devices to each other may further be based on signatures signed from each card's public key material.

At step 326, a shared secret may be generated based on a source signature signed from a source public key material of the source card device and a target signature signed from a target public key material of a target card device. In some embodiments, the generation of the shared key may be based on a process such as ECDH.

At step 327, a source private key material of the source card device may be duplicated onto the target card device.

At step 328, the source private key material may be deleted from the source card device upon confirmation that the key material has been duplicated onto the target card device.

At step 329, a verification that the target card device holds the duplicated source private key material and that the source card device no longer holds the source private key material may be performed. This verification may be used to allow the usage of the key material on the target card device.

In some embodiments, the process may be modified to be more or less fault tolerant while ensuring that the key material can only be used on one of the card devices depending where in the process the transfer occurs.

In some embodiments, additional metadata such as the passcode controlling the key material, name data for the cards, personal preferences and potentially additional cryptographic material may be relayed during and after the process. In one example, the metadata may include information about the visual appearance of the card (e.g., you may copy from a yellow source card to a purple target card). Presenting this information to the user across potentially multiple taps with the client device is extremely helpful to prevent confusion as to which card should be tapped.

In some embodiments, any user/holder/client with the correct passcode/PIN code (if set) may now verify the state of the two cards and verify that the source card device no longer holds (or can use) key material and that the target card device holds the material. When coupled with minimal state data about smart contracts stored on the client device, it may further be possible to verify that locked funds are contained/associated with the key material and smart contract as well as that the funds were transferred in a fully offline scenario without a blockchain transaction(s) and no expense to any party. For example, the transfer may be a transfer with locked funds that takes place in 2025 and the funds may be in a smart contract that precludes their transfer under any circumstances until 2027, or until a specific number of blocks have passed.

This method approximates a cash transaction with fully digital funds in a verifiable manner. In some embodiments, there may also be a "backup" feature that works in a similar fashion with the additional caveat that the cards would include metadata to indicate that keys have been cloned and whether or not a clone is the "source" or a "duplicate." In the case of this backup feature, the funds may not be treated like cash as both cards (and thus both parties if the owners of the cards are distinct) may spend the funds on chain.

Figure 4A:
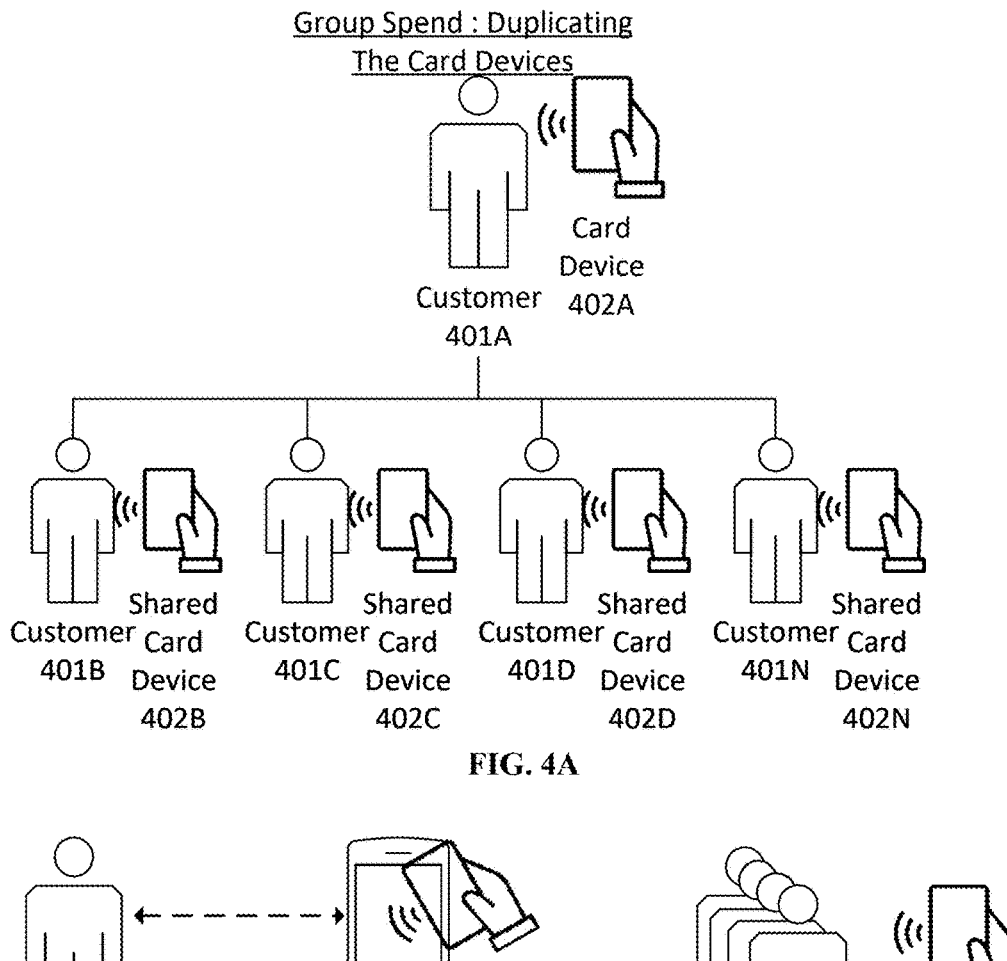
FIG. 4A is a diagram illustrating an exemplary use case of the digital currency device in accordance with aspects of the present disclosure.
Figure 4B:
FIG. 4B is a diagram illustrating an exemplary use case of the digital currency device in accordance with aspects of the present disclosure.
Figure 4C:
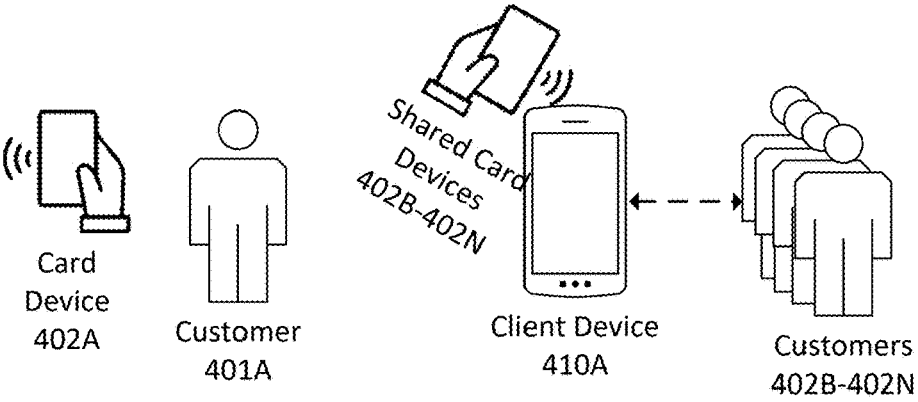
FIG. 4C is a diagram illustrating an exemplary use case of the digital currency device in accordance with aspects of the present disclosure.

FIGS. 4A-4C are diagrams illustrating group spending case in accordance with aspects of the present disclosure. A plurality of shared card devices 401A-401N may be tied to a single blockchain address where funds are stored. FIG. 4A shows that each customer 401A-401N each possess a corresponding shared card 402A-402N. In FIG. 4B customer 401A may be prompted to scan their shared card device 402A with client device 410A. The client device may be configured to make a copy of the information stored on shared card device 402A. In FIG. 4C, each of the remaining shared cards 402B-402N may be scanned by client device 410A, transferring the copied information to each of the cards.

In some embodiments, the duplication of a source card device as shown in FIGS. 4B-4C may be required to be performed atomically. For example, shared card device 402A (source card device) may need to be scanned for each duplication event. Each duplication event may be completed by scanning a target card device from the shared card devices 402B-N. In some embodiments, to complete each duplication event, the source card device may be scanned again to finalize the event. In some embodiments, the duplication of the source card to a plurality of shared card devices may be performed by scanning the source card device followed by scanning of each of the plurality of shared card devices. The source card device may also need to be scanned after the last shared card device to finalize the duplication event. In some embodiments, the customer 401A may input, to the client device 410A, the number of duplicates to be made before or after scanning of the source card device. The input may be compared against the number of target card devices that received the duplication information to verify a successful duplication between the source card device and the plurality of target card devices.

In some embodiments, the duplication may use a process where a shared secret is derived between the source card device 402A and each of the target card devices 402B-402N to encrypt the transmission of the key and addition of the key to the target card devices. In some embodiments, both the source and target card devices may track whether or not the key has been duplicated, how many times it has been duplicated, whether or not the card originated the key or merely holds a duplicate and whether or not the card both was a copy of the original and then further on served as a source to another card.

In some embodiments, further duplication of target cards and/or the source card is precluded or limited by a counter. In some embodiments, one or more individuals may load the card devices 402A-402N collectively such that the act of loading one loads all duplicated cad devices simultaneously. All the card devices are capable of spending the same set of funds, with the action of any one individual against any one card device immediately changing the state of all duplicated card devices.

Figure 4D:
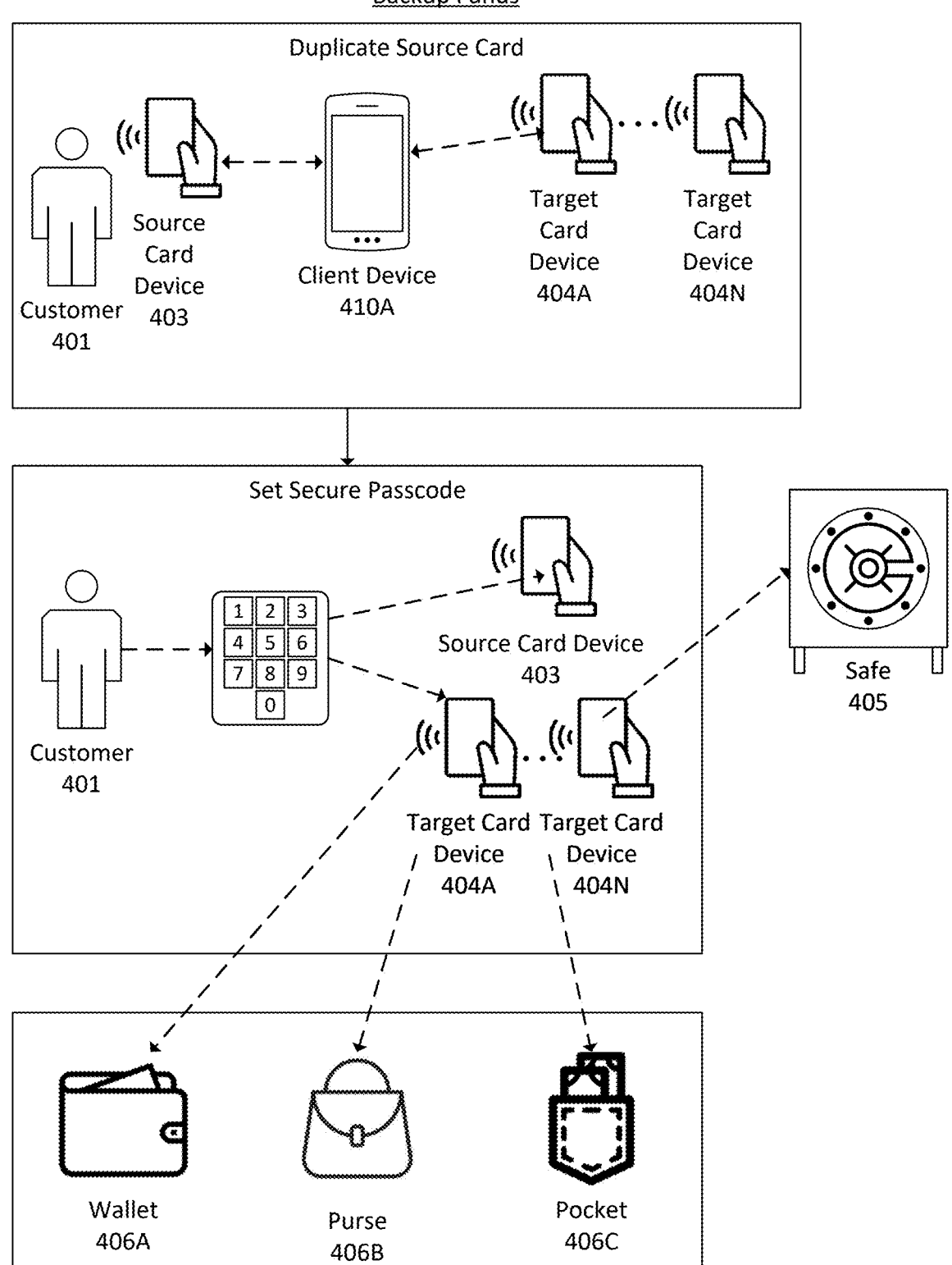
FIG. 4D is a diagram illustrating an exemplary use case of the digital currency device in accordance with aspects of the present disclosure.

FIG. 4D is a diagram illustrating a process to back up funds in accordance with aspects of the present disclosure. A customer 401 may choose to duplicate source card device 403. The duplication may be the same or similar process as explained above with regard to FIGS. 4A-4C. In some embodiments, the copying of the source card device 403 to the target card devices 404A-404N may require a pin or passcode to be set for the target cards. The target card device may then be stored as a backup of the source card device. FIG. 4D shows the storing of the target card devices in a safe 405, a wallet 406, a purse 406B and a pocket 406C.

In some embodiments, a secure handshake involving verification of signatures instead of a passcode may be used. In some embodiments, a PIN code may be a limited set of alphanumeric characters, or it may be an unlimited set of any character set that is in turn hashed, alone or with other data, to create a fixed length hash that is used as the PIN code.

In some embodiments, the customer 401 may keep at least one duplicate in a safe location (non-limiting embodiments include at home, hotel safe, bank vault, deposit box, with a family member, in a locked desk, in a safe, in a car, in an unused wallet, with a friend) and takes the other card on their person (non-limiting examples in a purse, in a pocket, in a wallet, in a clutch, in a bag, in a car, in a briefcase) or on the person of someone else (a spouse, family member, child, friend, colleague).

The customer 401 may spend funds from the card on their person, and, like any other payment instrument at risk, they may lose the card, have it stolen, misplace it, dispose of it or suffer any other non-limiting loss.

In some embodiments, the passcode and/or secure handshake may include an increment only counter to record bad attempts to access the funds. For instance, after 10 bad attempts of a passcode a card device may be permanently locked (and/or key material destroyed) such that no funds may be retrieved. This ensures that a misplaced card device cannot be spent by a person who is not the intended holder-so a subsequent individual and client will be prevented from spending funds. The customer 401 is protected from financial loss as they can retrieve the one or more duplicates they secured.

Figure 4E:
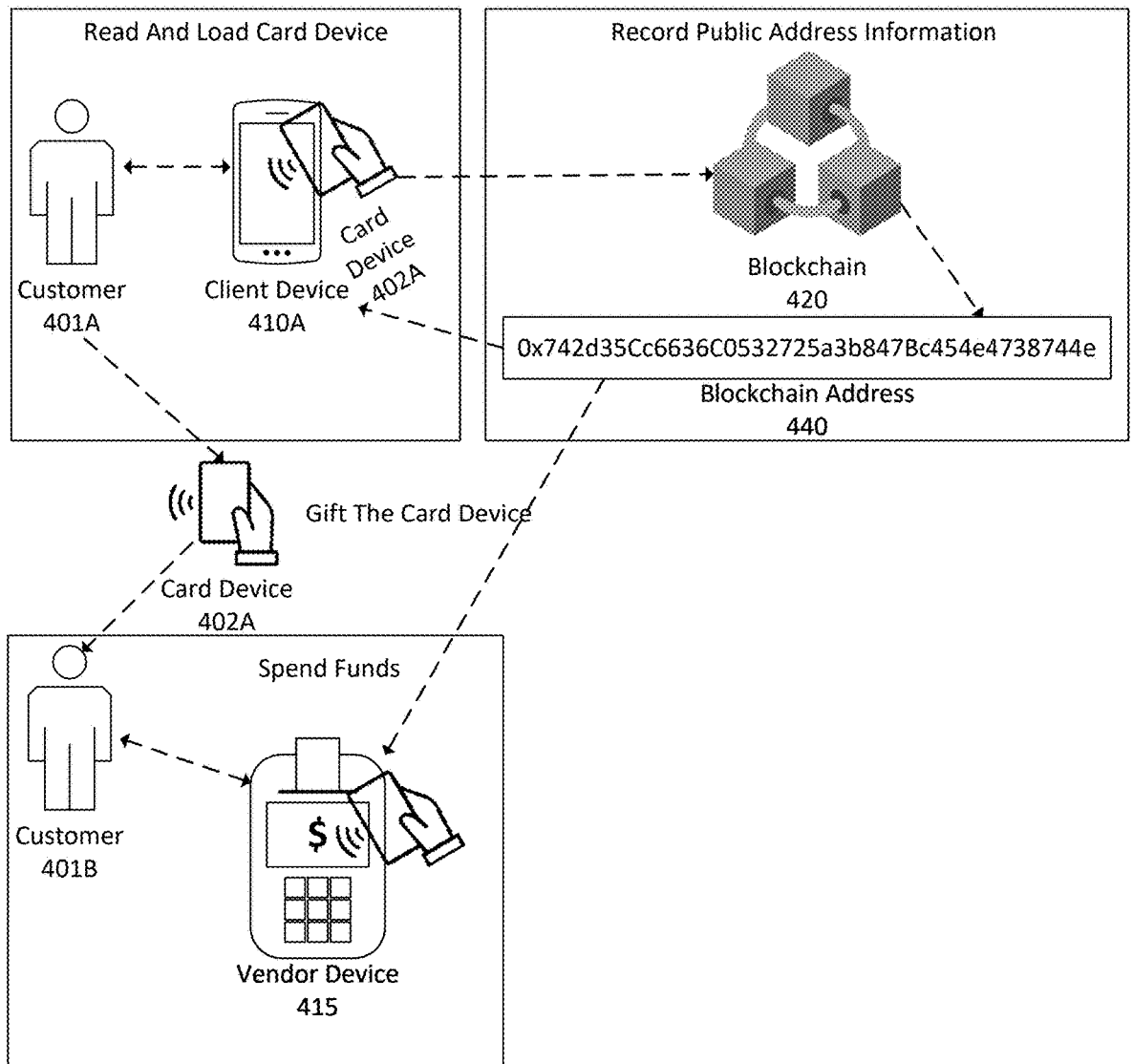
FIG. 4E is a diagram illustrating an exemplary use case of the digital currency device in accordance with aspects of the present disclosure.

FIG. 4E is a diagram illustrating a process of gifting a card device to someone else in accordance with aspects of the present disclosure. The customer 401A may wish to give card device 402A to customer 401B. The process may comprise the customer 401A using client device 410A to read the card device, communicate with the blockchain 420 to record public address information corresponding to device 402A and physically giving the card device 402A to customer 401B. Customer 401B may then use the card device 402A to complete a purchase or other transaction at vendor device 415. In some embodiments, the gifted card device may be a virtual card device.

In some embodiments, the card device 402A may be loaded by a first customer 401A. The first customer 401A may or may not set a passcode. The first customer 401A may record public address information about the card device. The first customer 401A subsequently may then give the gift card to a second customer 401B (e.g., child, remittance recipient, family member, benefits recipient, non-limiting beneficiary) and provides any included passcode. In some embodiments, the second customer 401B may verify the state of the gift card to ensure that no duplicates were created from the gift card. The second customer 401B may now spend funds from the gift card freely.

In one embodiment the second customer 401B may change the passcode on the gift card to further secure against the possibility that the first customer 401A may spend funds if they gain possession of the gift card again.

Figure 4F:
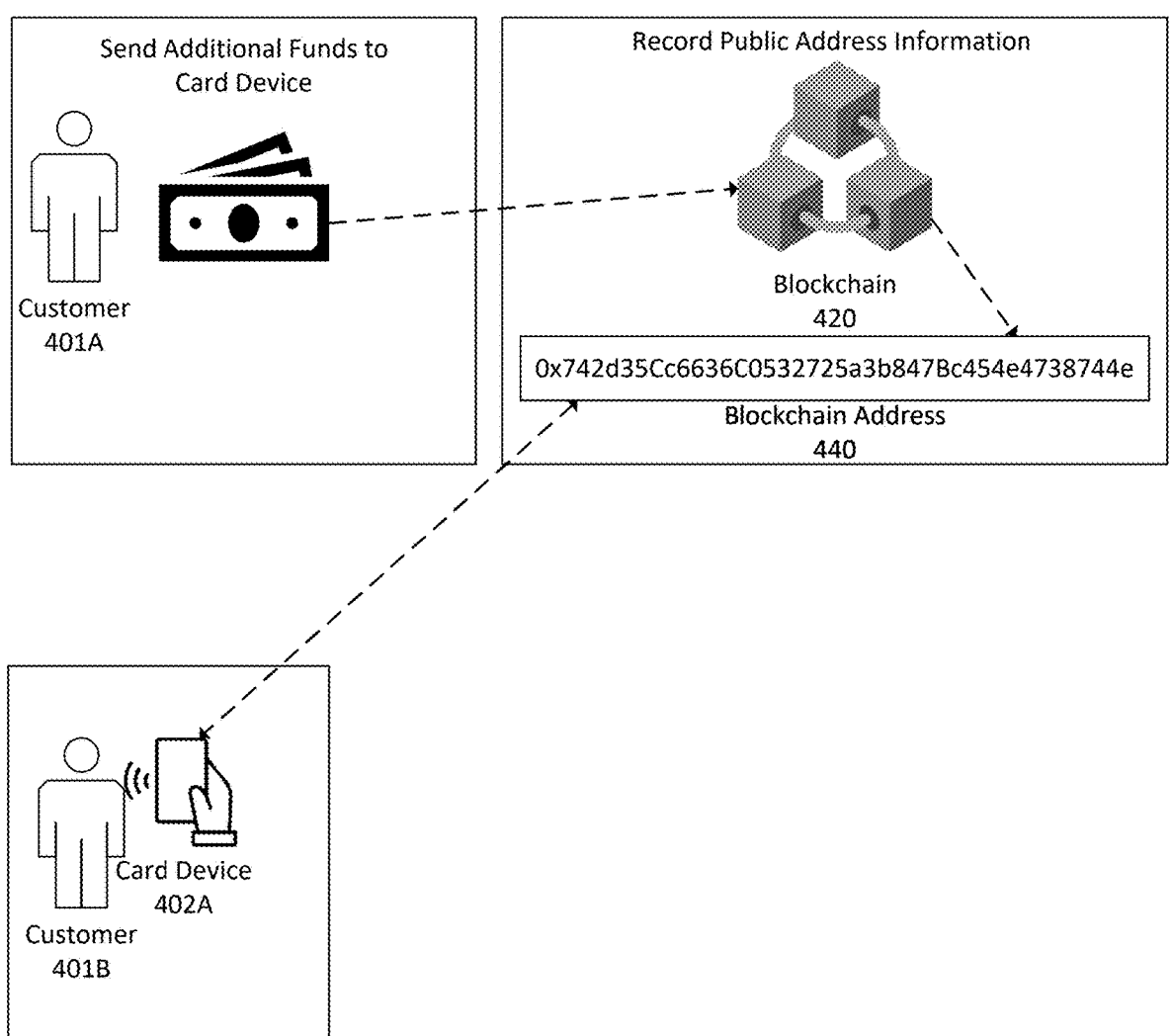
FIG. 4F is a diagram illustrating an exemplary use case of the digital currency device in accordance with aspects of the present disclosure.

FIG. 4F is a diagram illustrating a process of reloading a card remotely without a financial intermediary in accordance with aspects of the present disclosure. In some embodiments, customer 401A may send digital currency to the blockchain address 440 directly, without the need for an intermediary.

In some embodiments, the first customer 401A may send additional funds to the gift card (card device 402A) through the public address information without the need for a financial intermediary and without the ability to spend said funds themselves.

In some embodiments, the first customer 401A may keep a duplicate of the gift card, with indication to the second customer 401B, such that they maintain a backup in the event the second gift card is lost or stolen (e.g., in the mail during shipment).

In some embodiments, the second customer 401B with a duplicate gift card may be able to create a request from the duplicate gift card to delete key material from the source gift card and/or the source gift card may be able to create a secure message proving deletion of the key material.

Figure 4G:
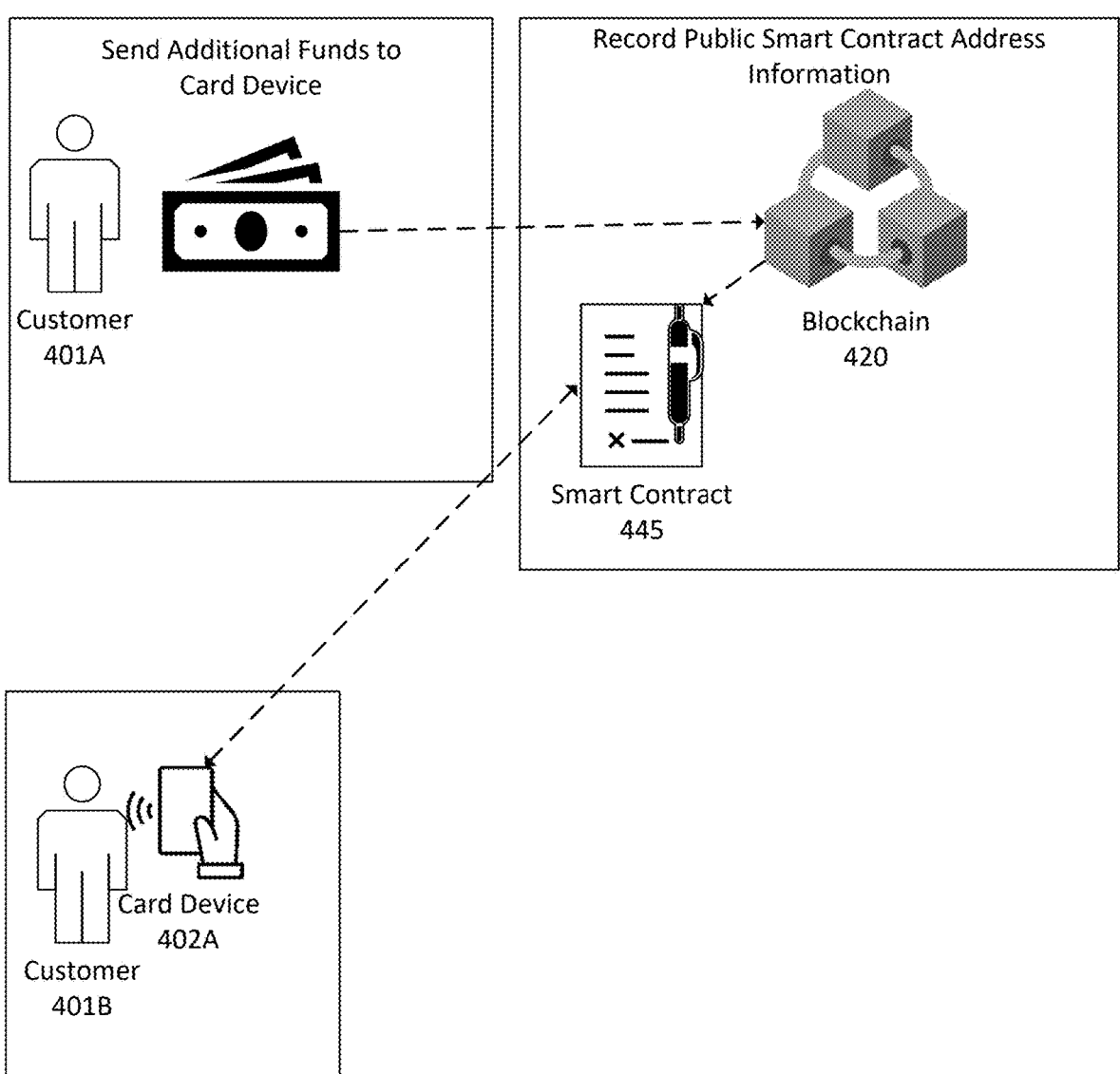
FIG. 4G is a diagram illustrating an exemplary use case of the digital currency device in accordance with aspects of the present disclosure.

FIG. 4G is a diagram illustrating a process of reloading a smart contract remotely without a financial intermediary in accordance with aspects of the present disclosure.

Figure 4H:
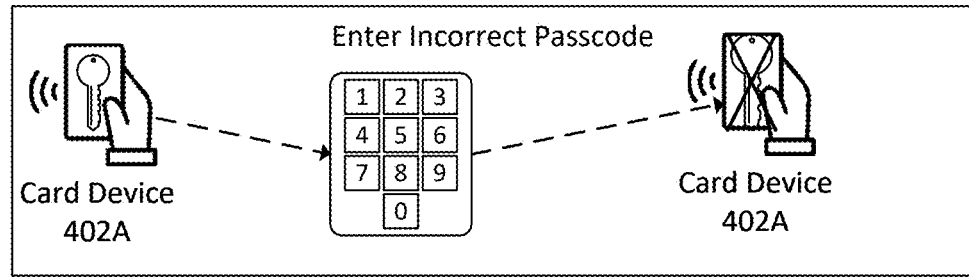
FIG. 4H is a diagram illustrating an exemplary use case of the digital currency device in accordance with aspects of the present disclosure.
Figure 4I:
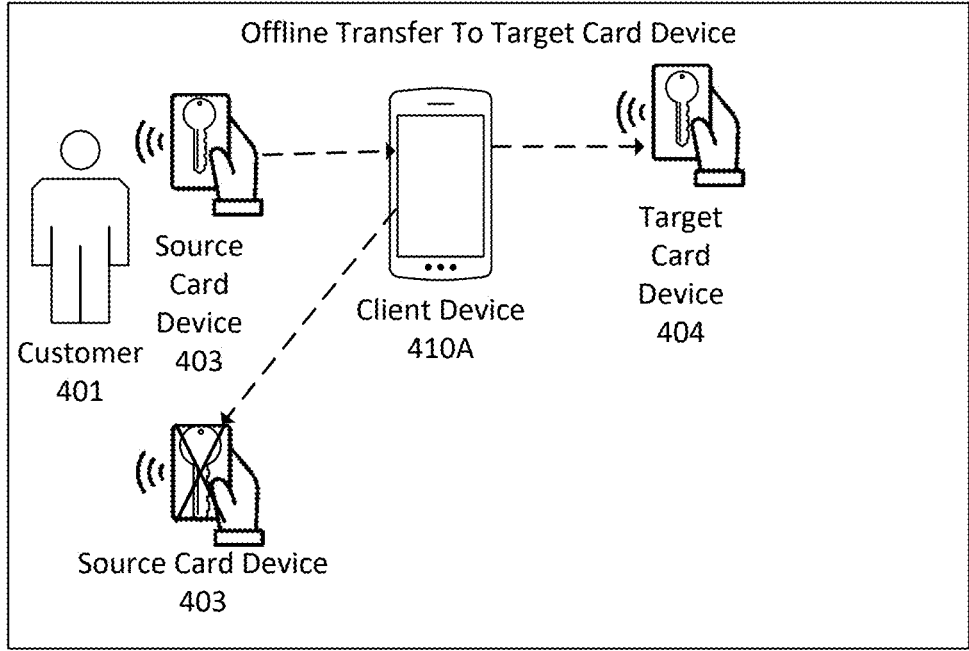
FIG. 4I is a diagram illustrating an exemplary use case of the digital currency device in accordance with aspects of the present disclosure.
Figure 4J:
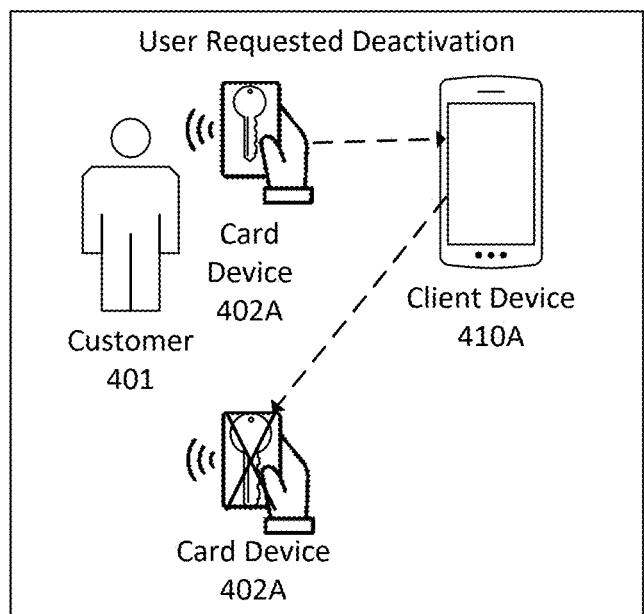
FIG. 4J is a diagram illustrating an exemplary use case of the digital currency device in accordance with aspects of the present disclosure.

FIGS. 4H-4J show processes where the key material is deactivated by request/command of a user. In some embodiments, the key may be removed from memory only after signing a final message using the key material indicating deletion. In some embodiments, this message may be verified in a smart contract, and it may, in turn, trigger one or more tasks like transferring funds or control, minting tokens, or any other non-limiting example of a smart contract action. In another embodiment this message may be verified by a centralized database for independent purposes.

In some embodiment's deletion of the key material may not delete other metadata about the key material, such as information about the duplication state, attestations made about the key material.

In some embodiments, the deactivation or deletion of the key material may only preclude the key from creating certain kinds of messages or commands. For example, the customer/user may still be able to ascertain certain information about the deleted or deactivated key material, e.g., to verify its removal or carry out limited operations.

Another example is that they key material may no longer be able to sign messages that would allow for transactions— e.g., sending funds or tokens—but rather it may only be able to sign messages that indicate the veracity of the key material itself or carry out other non-financial transactions on a blockchain.

In some embodiments, this may be accomplished by appending a prefix to the digest of every command sent such that said prefix is incompatible with creating any financial transaction. In some embodiments, this may be accomplished by comparing the contents of the digest to be signed.

FIG. 4H is a diagram illustrating a case in which too many attempts to enter a pin code or passcode have failed. The key associated with the card device 402A may be deactivated or deleted after a failed attempt threshold has been reached.

FIG. 4I is a diagram illustrating an offline transfer from a source card device to a target card device in accordance with aspects of the present disclosure. The customer 401 may scan the source card device with client device 410A. The client device may then transfer the key material from the source card device 403 to the target card device 404. After the transfer of the key material has been verified, the source card device may then be deactivated or have its key material deleted/removed. In some embodiments, the source card device may need to be scanned a second time after the transfer to facilitate the deletion of the key material. In some embodiments, the client device may be configured to generate a virtual card device and copy the key material from the source card device to the virtual card device. Upon verifying that the transfer was successful, the key material may be removed from the source card device before the virtual card device copies the key material to the target card device.

FIG. 4J is a diagram illustrating the deactivation/deletion of key material of the card device in response to user requested deactivation.

Figure 4K:
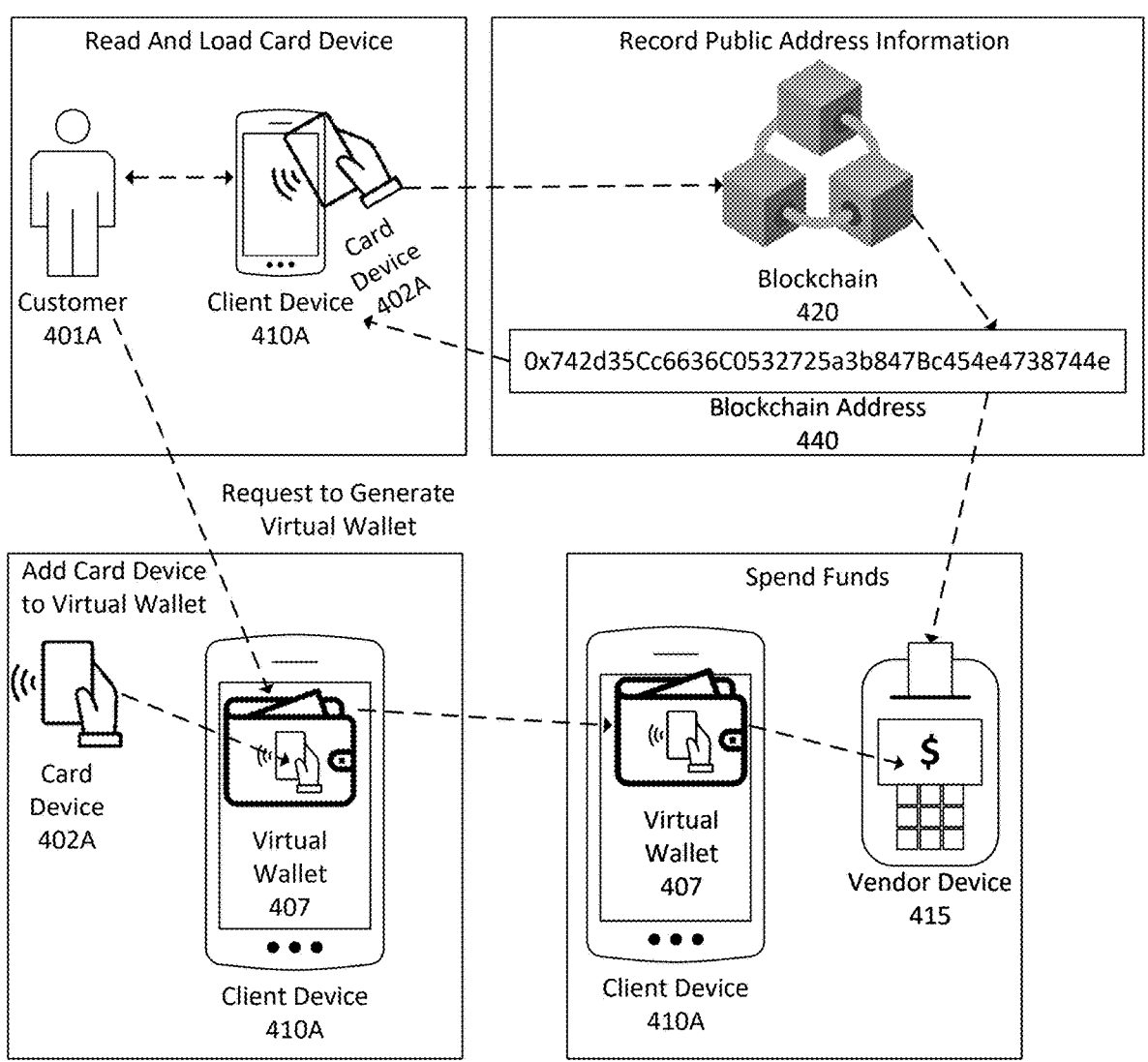
FIG. 4K is a diagram illustrating an exemplary use case of the digital currency device in accordance with aspects of the present disclosure.

FIG. 4K is a diagram illustrating the use of a virtual wallet in accordance with aspects of the present disclosure. The customer 401A may load card device 402A with funds. The card device may then be scanned by the client device 410A and loaded into a virtual wallet on the client device. The customer may then spend funds at vendor device 415 by scanning the client device which holds the virtual wallet in which the card device 402A has been loaded.

In some embodiments, a user (customer 401A) may obtain a gift card (card device 402A). The user may load the gift card with funds. The user may subsequently wish to add the gift card, in a virtual form (virtual gift card), to their virtual wallet 407 on client device 410A.

The user may initiate a command whereby they request the card generate a virtual wallet. In some embodiments, this may export the key material for an existing wallet. In some embodiments, this may create new key material. Key material may be encrypted such that only another card may decrypt it. In some embodiments, an independent HSM may also be able to decrypt the key material.

The exported key material may be formatted by the gift card system to be usable in a virtual wallet 407. The resulting virtual gift card may be sent from the virtual wallet to a point of sale system (vendor device 415) in order for the key material to be decrypted and used to conduct a transaction.

In some embodiments, the virtual gift card may be further loaded back onto a [physical] gift card which decrypts the key material.

Figure 4L:
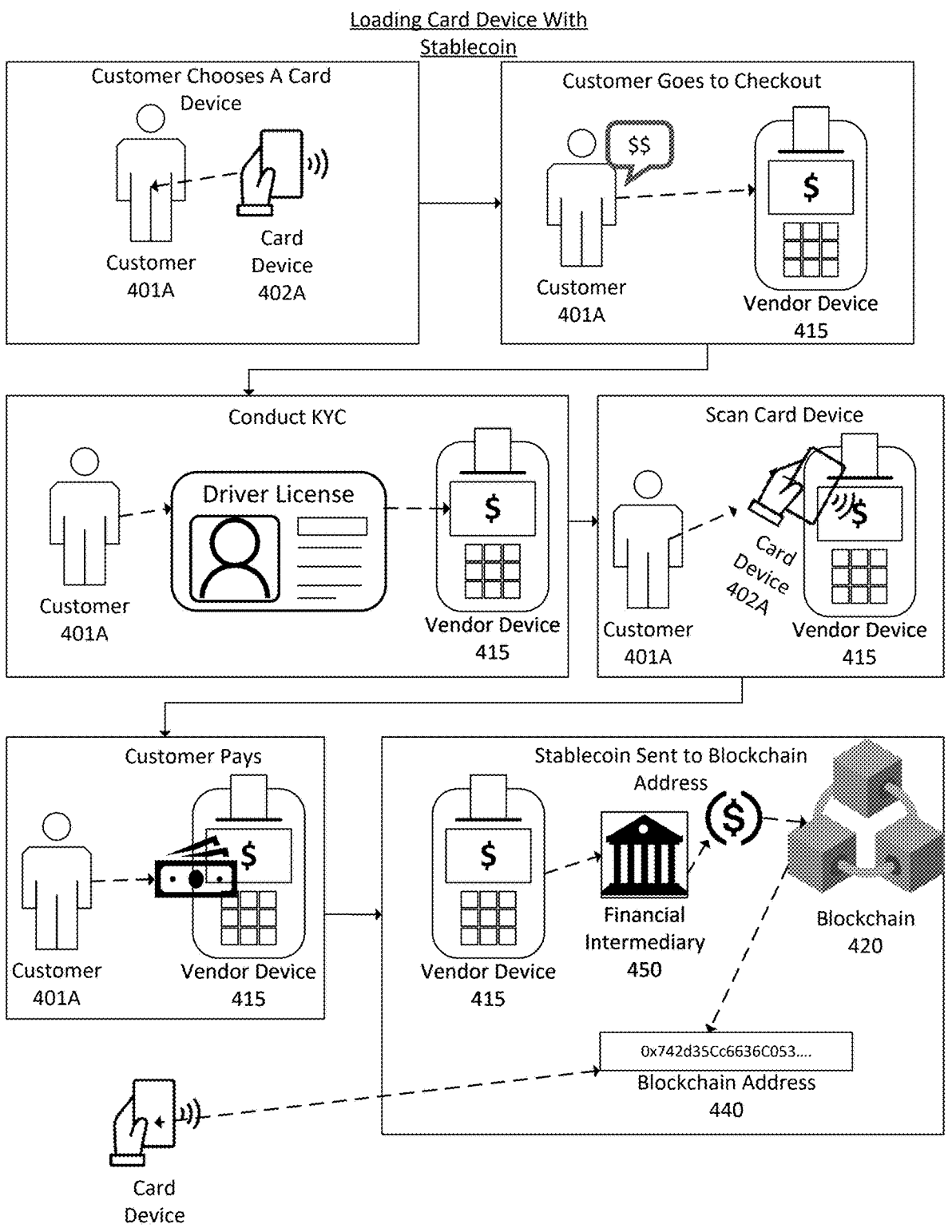
FIG. 4L is a diagram illustrating an exemplary use case of the digital currency device in accordance with aspects of the present disclosure.

FIG. 4L is a diagram illustrating the purchasing of a card device and the loading of stablecoin onto the card device in accordance with aspects of the present disclosure. The customer 401 may select a card device 402A to purchase and take the card device to the vendor device 415 to checkout. In some embodiments, a KYC process may be performed, such as scanning of a driver's license, passport or other identification documents. Upon completion of the KYC process, the card device may be scanned by the vendor device. Payment from the customer may be taken and transferred to a financial intermediary 450. The financial intermediary may be configured to convert the received funds from the customer to a stablecoin. The stablecoin may then be loaded into the blockchain address associated with the card device 402A, thus concluding the purchase.

In some embodiments, depending on the jurisdiction the gift card (card device 402A) is used in, KYC information may be needed to set the loaded card to an individual. In some embodiments, KYC may be needed, however, the user (customer 401A) may be able to first purchase an unloaded gift card in a retailer and then subsequently conduct all necessary KYC steps through their client device 410A all without further intervention from the retailer.

The point of sale device may link the KYC information to the user via contact information such as a phone number, email or other unique identifier. In order to carry out subsequent actions at the retailer such as loading or unloading corresponding tokens or digital assets from the card a user may only need to enter their phone number or unique identification In some embodiments, a text message or email or other message may be sent to the unique identifier of the user as a confirmation during this action. Likewise, for subsequent actions like "offramping," trading or "onramping" digital assets the customer 401A may access this KYC information directly from their client device 410A using the unique identifier and without subsequent intervention by the retailer.

Figure 4M:
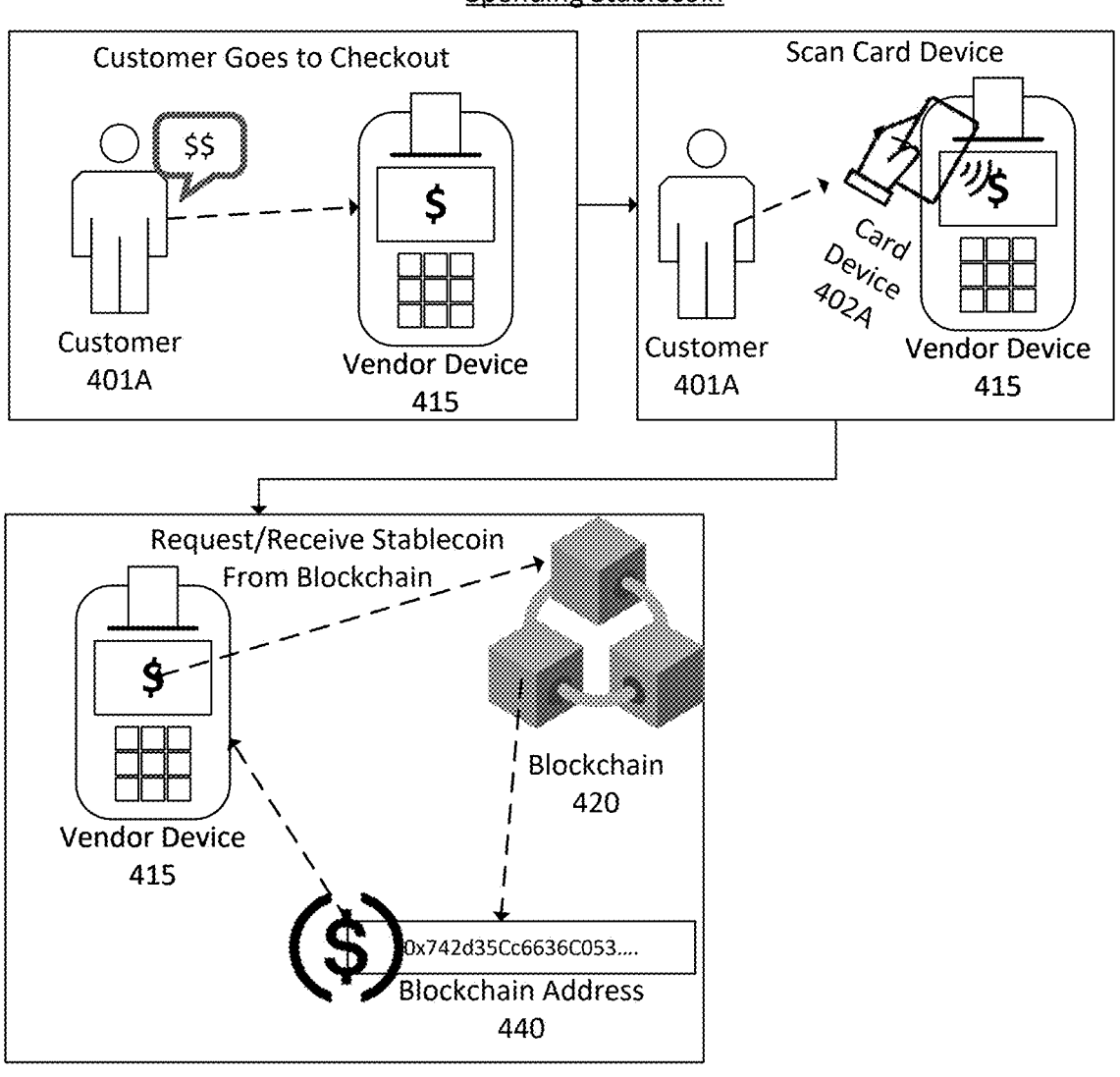
FIG. 4M is a diagram illustrating an exemplary use case of the digital currency device in accordance with aspects of the present disclosure.

FIG. 4M is a diagram illustrating spending of a stablecoin in accordance with aspects of the present disclosure. In some embodiments, the customer 401A may use card device 402A to make a purchase at vendor device 415. In some embodiments, a value of the purchase may be received at the vendor device 415 and a request for the value of the purchase may be sent to the blockchain 420. Stablecoin funds in the blockchain address 440 associated with the card device 402A may then be sent to the vendor device 415.

Figure 4N:
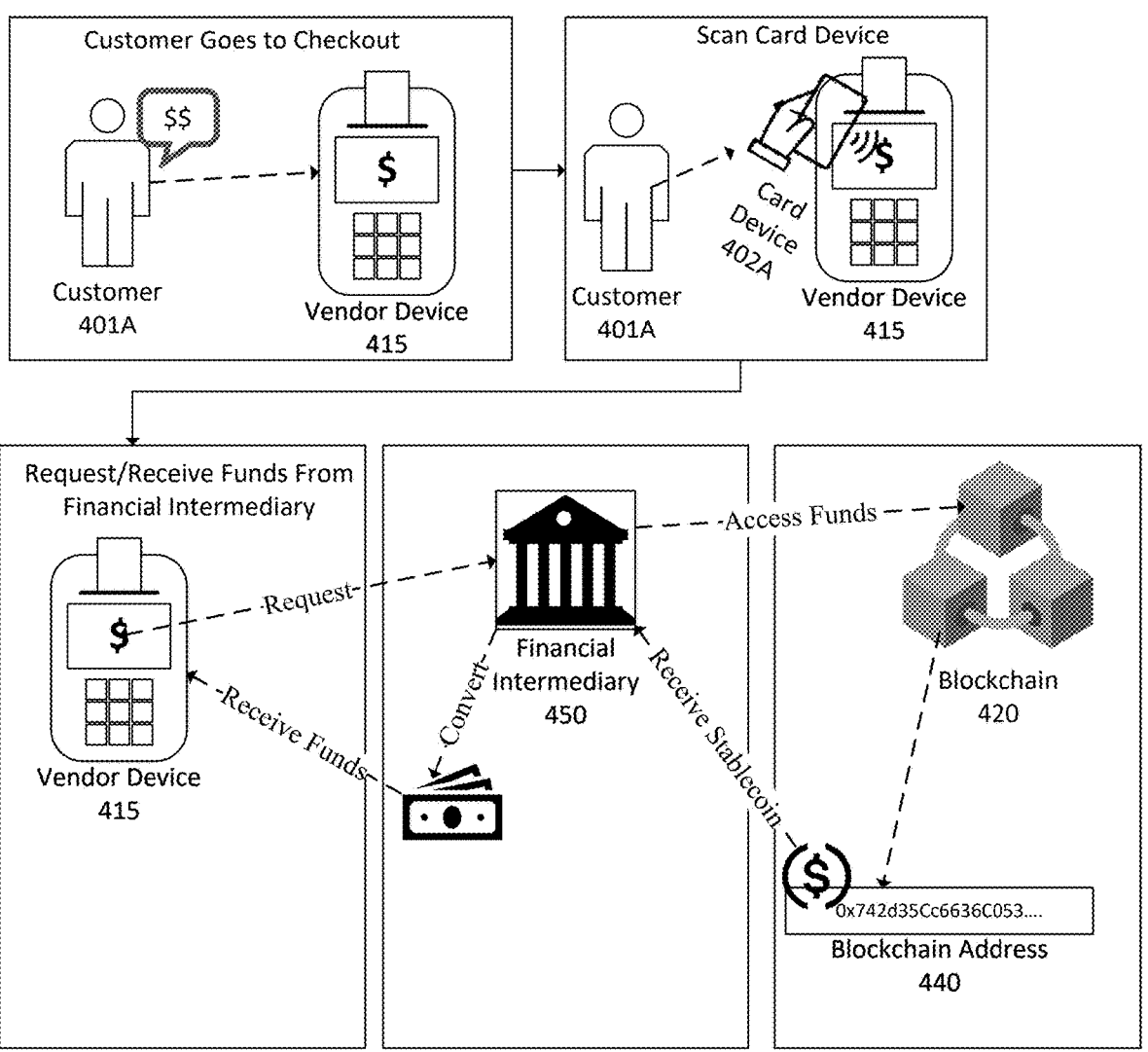
FIG. 4N is a diagram illustrating an exemplary use case of the digital currency device in accordance with aspects of the present disclosure.

FIG. 4N is a diagram illustrating spending of a stablecoin in accordance with aspects of the present disclosure. In some embodiments, the process may be the same as described with regards to FIG. 4M above, with the exception that a financial intermediary 450 may be used to convert the stablecoin to a fiat fund or other fund before being sent to the vendor device 415.

Figure 4O:
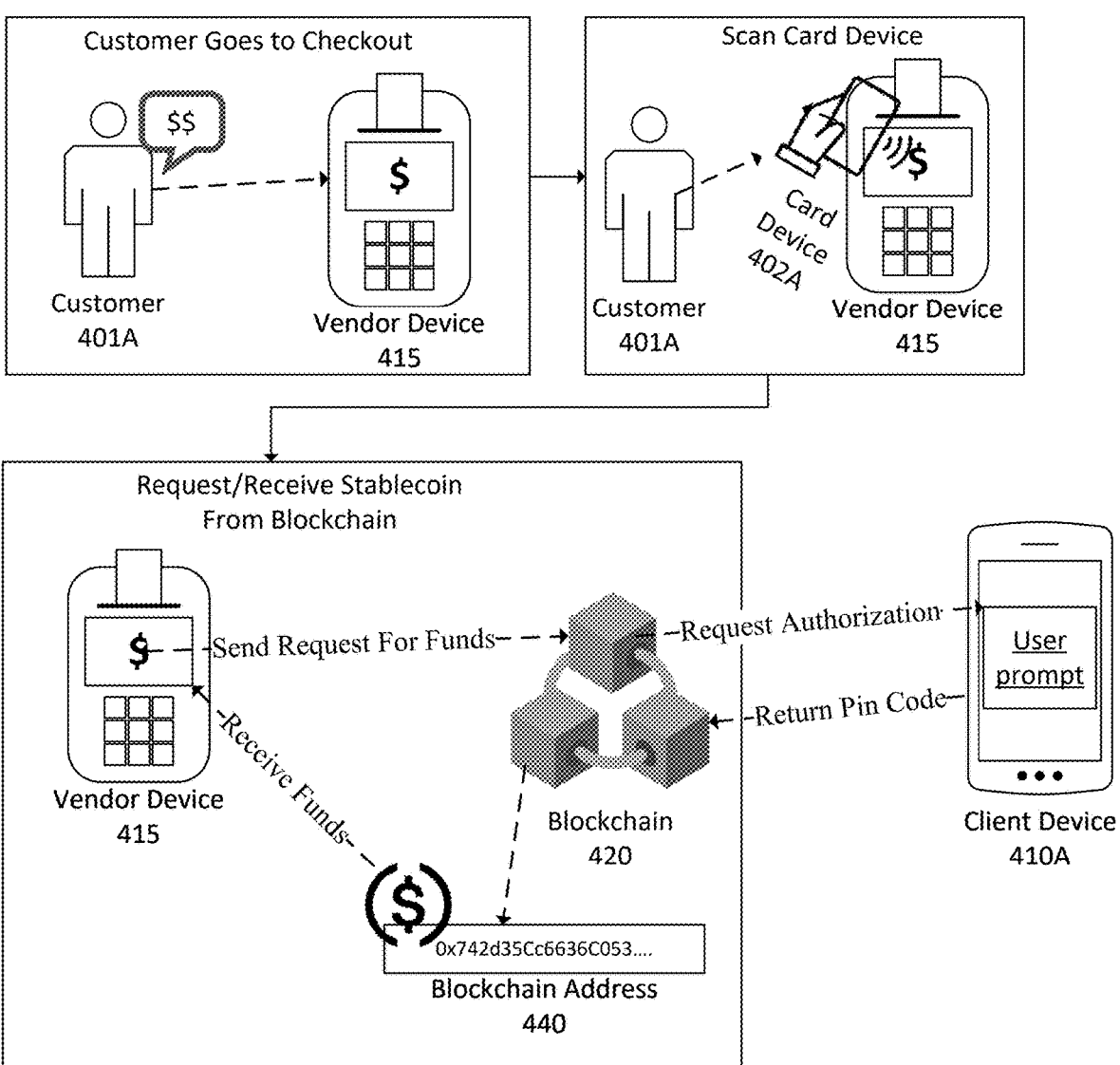
FIG. 4O is a diagram illustrating an exemplary use case of the digital currency device in accordance with aspects of the present disclosure.

FIG. 4O is a diagram illustrating spending of a stablecoin in accordance with aspects of the present disclosure. In some embodiments, the spending of stablecoin may require additional authorization or verification. As shown in FIG. 4O, the process of spending stablecoin may be the same as described in FIG. 4M, except that an additional input may be required from the customer. In some embodiments, the customer may be prompted to enter a pin number or passcode on their client device 410A or into the vendor device 415.

Figure 4P:
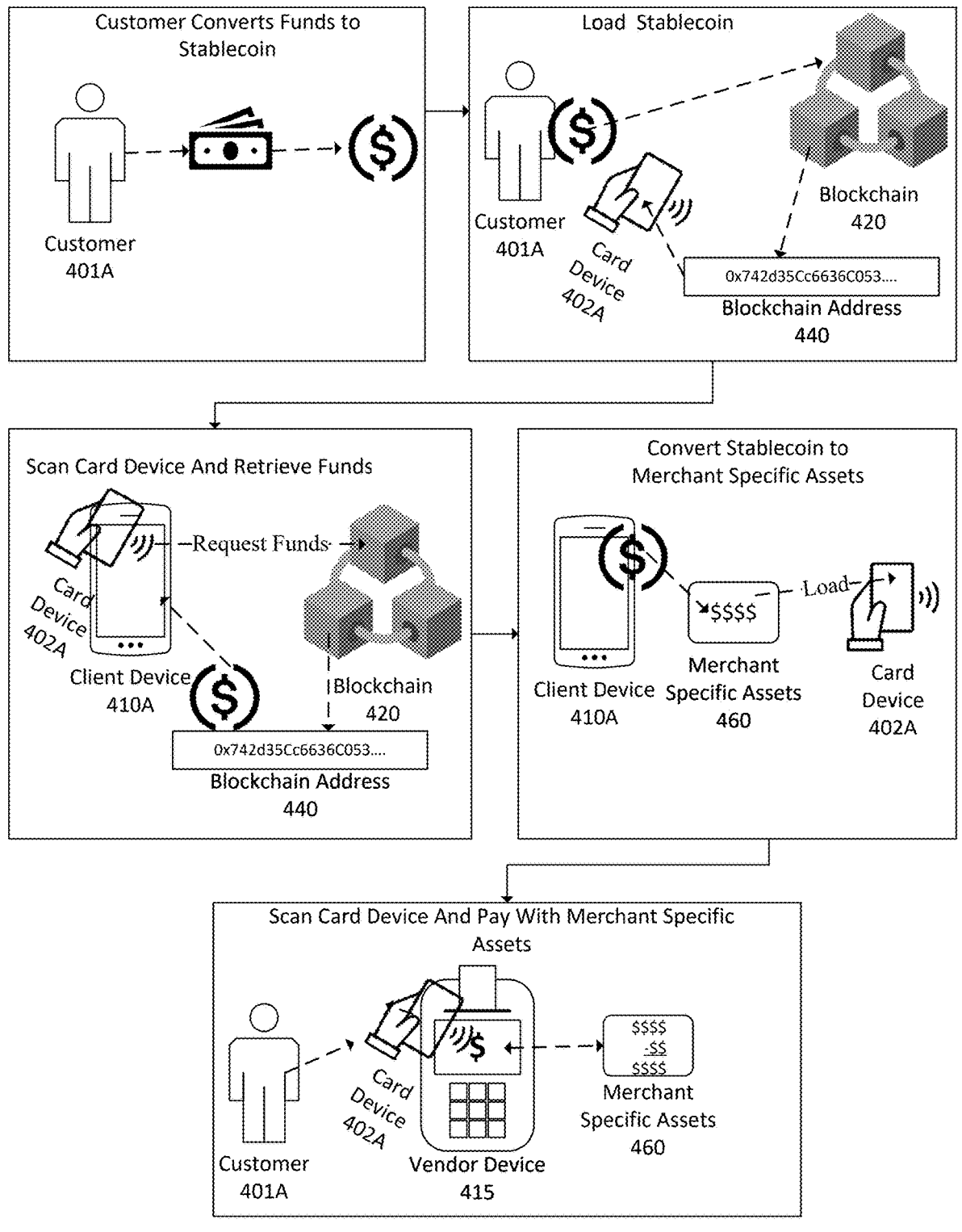
FIG. 4P is a diagram illustrating an exemplary use case of the digital currency device in accordance with aspects of the present disclosure.

FIG. 4P is a diagram illustrating the conversion of stablecoin to a merchant specific asset in accordance with aspects of the present disclosure. In some embodiments, the customer may convert fiat funds to stablecoin and load the stablecoin into the blockchain address associated with card device 402A. The client may at a later time request stablecoin from the blockchain address and convert the stablecoin to a merchant specific asset. Conversion may be performed at the client device, the vendor device, a financial intermediary, a clearinghouse or through another merchant device/server/service. The merchant specific assets may then be spent the same manner as a gift card at the vendor device.

A user/customer may obtain a gift card (card device 402A) and load it with stablecoin funds (e.g., those digital assets that approximate a government currency such as the US Dollar) or they may obtain a preloaded gift card. In some embodiments, the user, with their client device and without the need for a financial intermediary, may be able to transform the stablecoin digital assets into digital assets specific to a retailer (merchant specific assets 460). In some embodiments, the process may take place in reverse order. In some embodiments, the user may pay a discount or premium for the retailer or stablecoin asset, with or without additional fees. In some embodiments, the user may need to perform a KYC process. The user, without physical transformation of the card, may immediately be able to spend funds at the resulting retailer. In the case of trading the funds into a stablecoin, the user may immediately be able to offramp the funds to a traditional bank account without subsequent intermediaries.

FIGS. 4Q and 4R are diagrams illustrating the transfer of stablecoin from one blockchain address 440 to a target blockchain address 440B without needing to go through a financial intermediary. The target blockchain address 440B may correspond to a client device, virtual wallet, a smart contract, or a different card device.

Figure 4S:
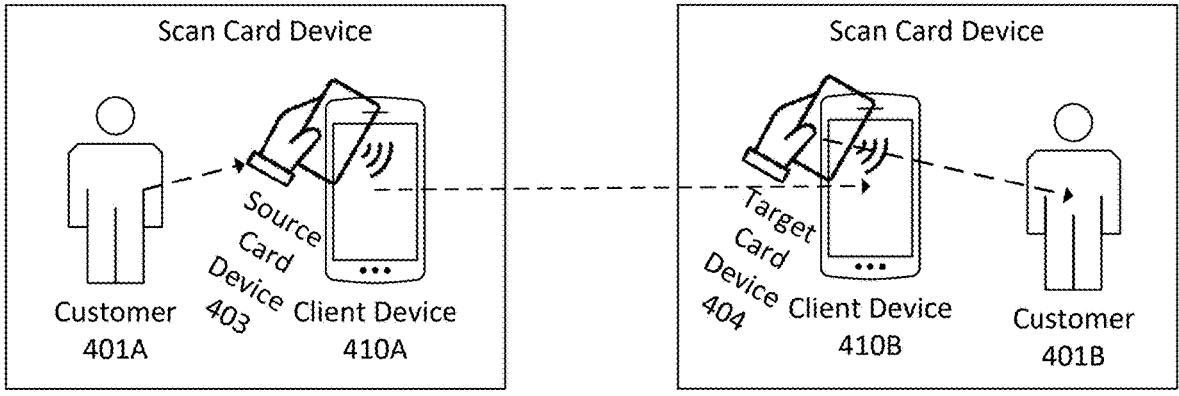
FIG. 4S is a diagram illustrating an exemplary use case of the digital currency device in accordance with aspects of the present disclosure.

FIG. 4S is a diagram illustrating the transferring of a card device from one customer to another customer off blockchain. The transfer may comprise converting the card device to a virtual card device and sending the virtual card device to a recipient device without going through the blockchain. The transfer may be facilitated though email, direct message, NFC bump/tap between two devices or other communication between two devices. The received virtual card device may then be stored on the recipient's device or loaded onto a physical card device. For example, customer 401A may scan/read source card device 403 with client device 410A. Client device 410A may then use the information received from source card device 403 to create a virtual card device. The virtual card device may then be sent to a second customer, customer 401B. The client device 410B of customer 401B may store the virtual card device locally, load it into a virtual wallet, transfer it to a hardware wallet, or load it onto a target card device 404.

Figure 4T:
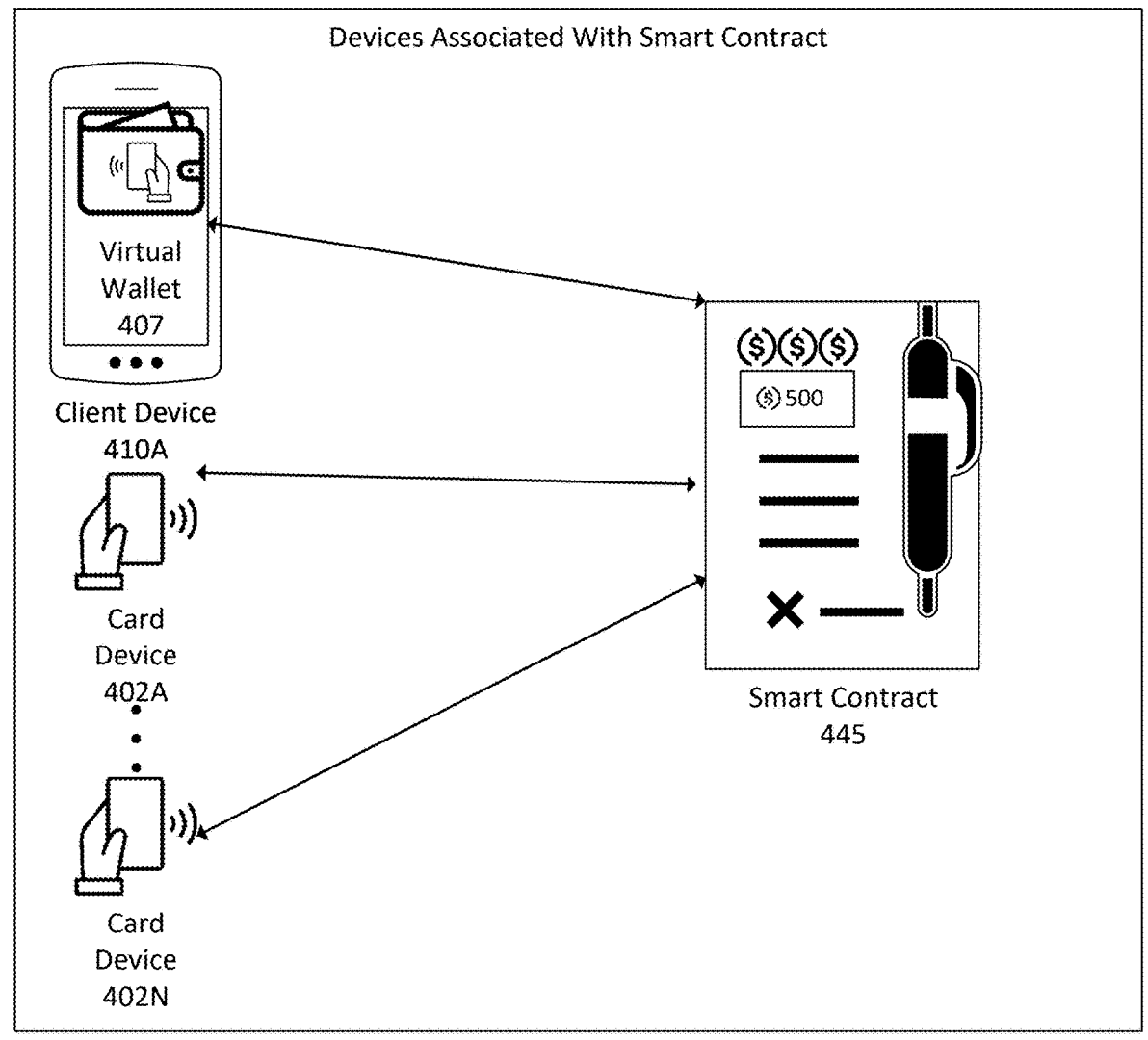
FIG. 4T is a diagram illustrating an exemplary use case of the digital currency device in accordance with aspects of the present disclosure.
Figure 4U:
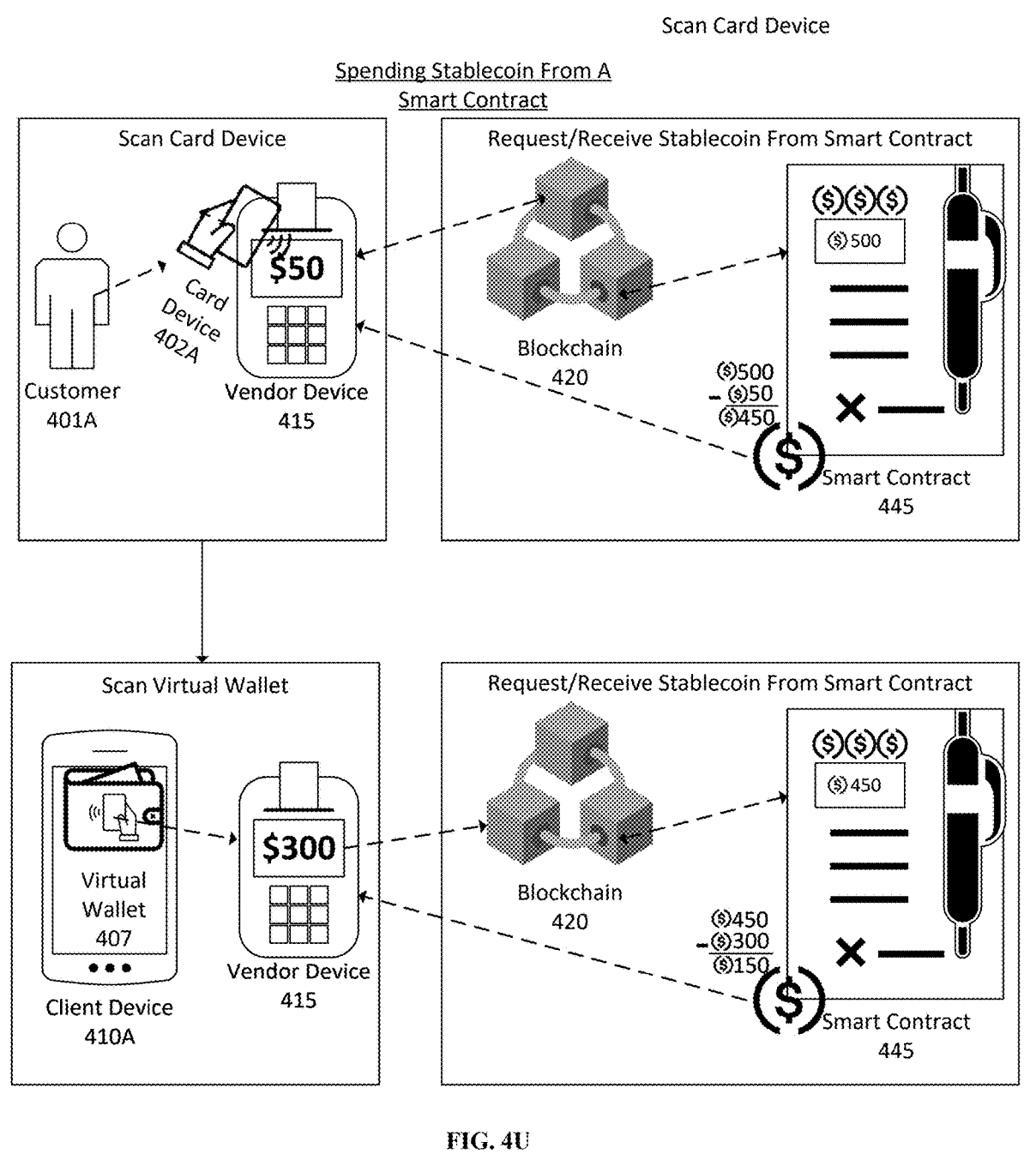

FIGS. 4T and 4U are diagrams illustrating spending of stablecoin from a smart contract. FIG. 4T shows multiple entities and their association with the smart contract 445. In some embodiments, the smart contract 445 may be used as a wallet. Funds may be stored in the smart contract and one or more keys may be associated with the smart contract. Each of the one or more associated keys may be allowed to spend from the same wallet (smart contract). The one or more associated keys may be keys from card devices 402A-402N, virtual wallet 407, virtual card devices and/or client devices.

In some embodiments, spending from the smart contract may require additional approval from the client device. In some embodiments, there may be additional rule sets associated with the smart contract and/or the keys associated with the smart contract. For example, the smart contract may have a rule limiting spending from a card device by setting maximum amount for any given transaction.

Figure 5:
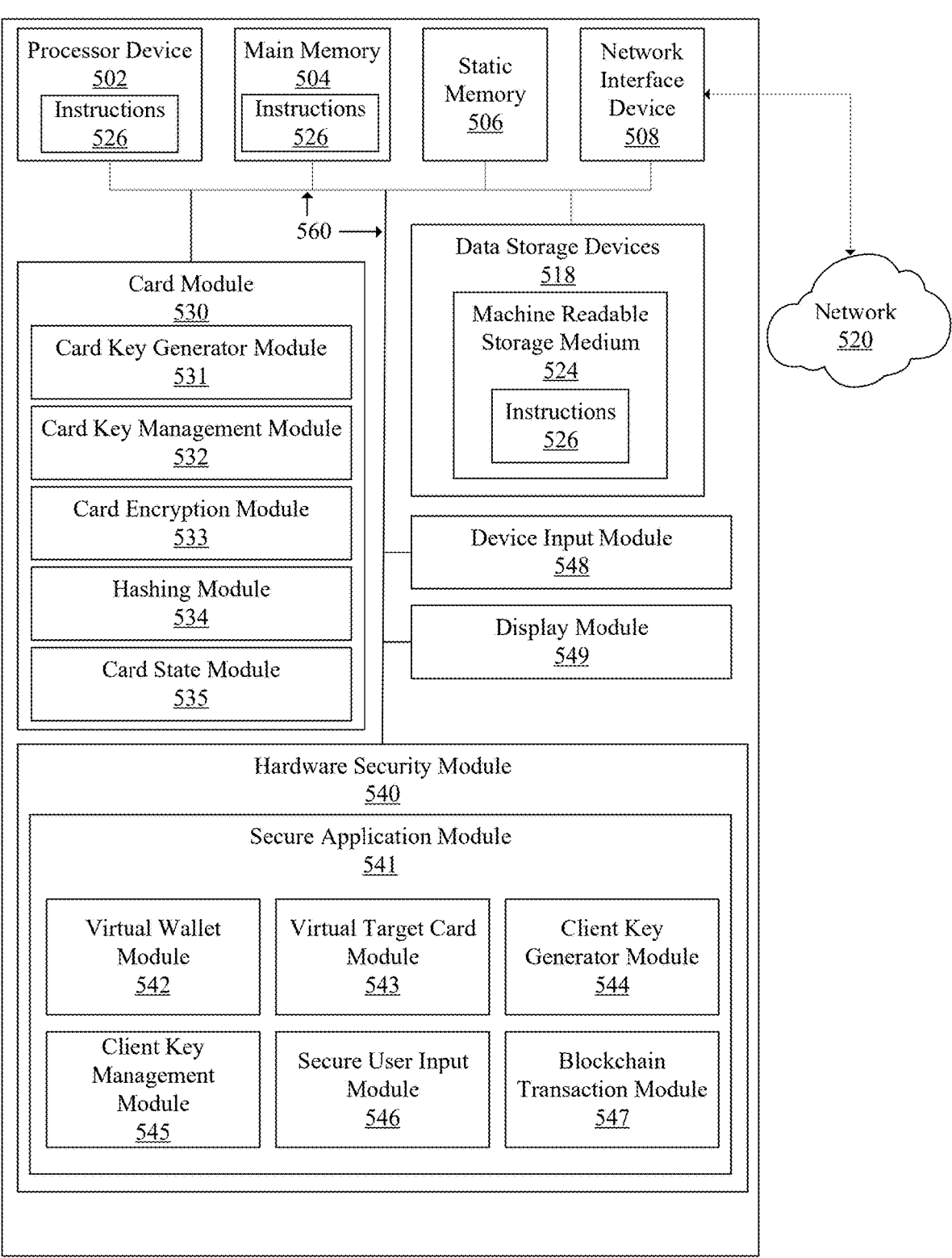
FIG. 5 is a diagram illustrating an exemplary computer/ control system that may perform processing in some embodiments and in accordance with aspects of the present disclosure.

FIG. 5 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 560.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520.

The computer system 500 may also include card module 530, hardware security module 540, device input module 548 and display module 549.

Card module 530 may further comprise card key generator module 531, card key management module 532, card encryption module 533, hashing module 534 and card state module 535. Card module 530, card key generator module 531, card key management module 532, card encryption module 533, hashing module 534 and card state module 535 may be the same or similar to that of card module 105, card key generator module 203, card key management module 204, card encryption module 205, hashing module 206, card state module 207 as disclosed in FIG. 2B.

Hardware security module 540 may further comprise secure application module 541, virtual wallet module 542, virtual target card device 543, client key generator module 544, client key management module 545, secure user input module and blockchain transaction module 547.

Hardware security module 540 may be the same or similar to that of hardware security modules (HSM) 245 as disclosed in FIG. 2D.

Secure application module 541 may be the same or similar to that of secure application module 216, 236 and 246 as disclosed in FIGS. 2B-2D.

Virtual wallet module 542 may be the same or similar to that of virtual wallet module 218 as disclosed in FIG. 2B.

Virtual target card device 543 may be the same or similar to that of virtual target card device 238 and 247 as disclosed in FIGS. 2C and 2D.

Client key generator module 544 may be the same or similar to that of client key generator module 219 as disclosed in FIG. 2B.

Client key management module 545 may be the same or similar to that of client key management module 220 as disclosed in FIG. 2B.

Secure user input module 546 may be the same or similar to that of secure user input module 221 and 239 as disclosed in FIGS. 2B and 2C.

Blockchain transaction module 547 may be the same or similar to that of blockchain transaction module 240 and 248 as disclosed in FIGS. 2C and 2D.

Device input module 548 and display module 549 may be the same or similar to that of device input module 214 and 234 as disclosed in FIGS. 2B and 2C.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. Information, including data used in the processes and methods of the system and the one or more sets of instructions or software, may also be stored in blockchain, as NFTs or other decentralized technologies.

In one implementation, the instructions 526 include instructions to implement functionality corresponding to the components of a device to perform the disclosure herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1. A digital currency management platform, wherein the digital currency management platform comprises: a first card device, wherein the first card device comprises: a first communication module; a first card key generator module; a first card key management module; and a first card encryption module; a client device, wherein the client device comprises: a client network module; a client card communication module; a client device input module; a client display module; and a client secure application module, wherein the client secure application module comprises: a virtual wallet module, a client key generator module; a client key management module; and a client secure user input module; a vendor device, wherein the vendor device comprises: a vendor network module; a vendor card communication module; a vendor device input module; a vendor display module; and a vendor secure application module, wherein the vendor secure application module comprises: a vendor secure user input module; a vendor blockchain transaction module; and a vendor virtual target card device, wherein the virtual target card device is configured to: generate vendor keys; manage vendor keys; encrypt keys and information; decrypt keys and information; and store information of the state of the vendor virtual target card; wherein the vendor device is configured to: perform a KYC check corresponding to a holder of the first card device; initiate a session with the first card device, wherein the initiating comprises: requesting the first card device sign a signature to verify its authenticity; retrieve public key information for the first card device; associate the public key information with the session; receive a payment from the holder, wherein the payment is a first amount in a first currency; create a blockchain address linked to the holder and the first card device; and transfer an amount of a first digital currency to the blockchain address, wherein the amount of the first digital currency is equivalent to the received payment from the holder.

Example 2. The system of Example 1, wherein the first card device further comprises a first hashing module, wherein the first hashing module is configured to: hash each digest signed, wherein the hashing further comprises hashing a current digest signed with an internally stored historic hash, wherein the historic hash contains all previous hashes of hashes.

Example 3. The system of any one of Examples 1-2, wherein the first card device further comprises a first card state module, wherein the first card state module is configured to: store a duplication state of the first card device, wherein the duplication state indicates whether the first card device has been duplicated or not; store a duplication count for the first card device; store information corresponding to the origin of a key, wherein the origin indicates that the key originated from the first card device or holds a duplicate of the key; store information indicating if the first card device served as a source of a duplication procedure, wherein the duplication procedure comprises transferring data from the first card device to a target card device.

Example 4. The system of any one of Examples 1-3, wherein the first card device is further configured to perform an offline transfer procedure, the offline transfer procedure comprising: performing, by the client device, a first scan of the first card device; verifying, based on the first scan, a transfer state of the first card device and the client device, wherein the transfer state corresponds to an authorization of the first card device and client device being allowed to transfer funds stored in the blockchain address; performing, by the client device, a second scan of a receiving card device; verifying, based on the second scan, a receive state of a receiving card device, wherein the receiving state corresponds to the receiving card device being allowed to receive funds; verifying, based on the first scan and the second scan, authenticity of the first card device and the receiving card device; generating a shared secret based on a source signature signed from a source public key material of the first card device and a target signature signed from a target public key material of a receiving card device; duplicating, onto the receiving card device, a source private key material of the first card device; deleting, from the first card device, the source private key material; and verifying that the receiving card device holds the duplicated source private key material and that the first card device no longer holds the source private key material.

Example 5. A method for digital currency management, wherein the method comprises: selecting, by a customer, a first card device; performing, at a vendor device, a KYC check corresponding to the customer; initiating, by the vendor device, a session with the first card device, wherein the initiating comprises: requesting the first card device sign a signature to verify its authenticity; retrieving public key information for the first card device; associating the public key information with the session; receiving a payment from the customer, wherein the payment is a first amount in a first currency; creating a blockchain address linked to the customer and the first card device; and transferring an amount of a first digital currency to the blockchain address, wherein the amount of the first digital currency is equivalent to the received payment from the customer.

Example 6. The method of Example 5, wherein the first card device further comprises a first hashing module, wherein the first hashing module is configured to: hash each digest signed, wherein the hashing further comprises hashing a current digest signed with an internally stored historic hash, wherein the historic hash contains all previous hashes of hashes.

Example 7. The method of any one of Examples 5-6, wherein the first card device further comprises a first card state module, wherein the first card state module is configured to: store a duplication state of the first card device, wherein the duplication state indicates whether the first card device has been duplicated or not; store a duplication count for the first card device; store information corresponding to the origin of a key, wherein the origin indicates that the key originated from the first card device or holds a duplicate of the key; store information indicating if the first card device served as a source of a duplication procedure, wherein the duplication procedure comprises transferring data from the first card device to a target card device.

Example 8. The method of any one of Examples 5-7, wherein the first card device is further configured to perform an offline transfer procedure, the offline transfer procedure comprising: performing, by the client device, a first scan of the first card device; verifying, based on the first scan, a transfer state of the first card device and the client device, wherein the transfer state corresponds to an authorization of the first card device and client device being allowed to transfer funds stored in the blockchain address; performing, by the client device, a second scan of a receiving card device; verifying, based on the second scan, a receive state of a receiving card device, wherein the receiving state corresponds to the receiving card device being allowed to receive funds; verifying, based on the first scan and the second scan, authenticity of the first card device and the receiving card device; generating a shared secret based on a source signature signed from a source public key material of the first card device and a target signature signed from a target public key material of a receiving card device; duplicating, onto the receiving card device, a source private key material of the first card device; deleting, from the first card device, the source private key material; and verifying that the receiving card device holds the duplicated source private key material and that the first card device no longer holds the source private key material.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A digital currency management platform, wherein the digital currency management platform comprises:

a first card device, wherein the first card device comprises:
   a first communication module;
   a first card key generator module;
   a first card key management module; and
   a first card encryption module;
a client device, wherein the client device comprises:
   a client network module;
   a client card communication module;
   a client device input module;
   a client display module; and
   a client secure application module, wherein the client secure application module comprises:
      a virtual wallet module,
      a client key generator module;
      a client key management module; and
      a client secure user input module;
a vendor device, wherein the vendor device comprises:
   a vendor network module;
   a vendor card communication module;
   a vendor device input module;
   a vendor display module; and
   a vendor secure application module, wherein the vendor secure application module comprises:
      a vendor secure user input module;
      a vendor blockchain transaction module; and
      a vendor virtual target card device, wherein the virtual target card device is configured to:
         generate vendor keys;
         manage vendor keys;
         encrypt keys and information;
         decrypt keys and information; and
         store information of the state of the vendor virtual target card;
wherein the vendor device is configured to:
   perform a KYC check corresponding to a holder of the first card device;
   initiate a session with the first card device, wherein the initiating comprises:
      scanning the first card device;
      sending, to the first card device, an activation command, wherein upon receiving said activation command, the first card device generates key material within the card and uses said key material to place the first card device in an active mode;
      requesting the first card device sign a signature to verify its authenticity;
      retrieving public key information for the first card device;
      associating the public key information with the session;
      receiving a payment from the holder, wherein the payment is a first amount in a first currency;
      creating a blockchain address linked to the holder and the first card device; and
   transferring an amount of a first digital currency to the blockchain address, wherein the amount of the first digital currency is equivalent to the received payment from the holder; and
wherein the digital currency management platform is configured to perform an offline transfer procedure, the offline transfer procedure comprising:
   performing, by the client device, a first scan of the first card device;

verifying, based on the first scan, a transfer state of the first card device and the client device, wherein the transfer state corresponds to an authorization of the first card device and client device being allowed to transfer funds stored in the blockchain address;

performing, by the client device, a second scan of a receiving card device;

verifying, based on the second scan, a receive state of the receiving card device, wherein the receiving state corresponds to the receiving card device being allowed to receive funds;

verifying, based on the first scan and the second scan, authenticity of the first card device and the receiving card device;

generating a shared secret based on a source signature signed from a source public key material of the first card device and a target signature signed from a target public key material of the receiving card device;

duplicating, onto the receiving card device, a source private key material of the first card device;

deleting, from the first card device, the source private key material; and verifying that the receiving card device holds the duplicated source private key material and that the first card device no longer holds the source private key material.

2. The platform of claim 1, wherein the first card device further comprises a first hashing module, wherein the first hashing module is configured to:

hash each digest signed, wherein the hashing further comprises hashing a current digest signed with an internally stored historic hash, wherein the historic hash contains all previous hashes of hashes.

3. The platform of claim 2, wherein the first card device further comprises a first card state module, wherein the first card state module is configured to:

store a duplication state of the first card device, wherein the duplication state indicates whether the first card device has been duplicated or not;

store a duplication count for the first card device;

store information corresponding to the origin of a key, wherein the origin indicates that the key originated from the first card device or holds a duplicate of the key;

store information indicating if the first card device served as a source of a duplication procedure, wherein the duplication procedure comprises transferring data from the first card device to a target card device.

4. A method for digital currency management, wherein the method comprises:

selecting, by a customer, a first card device;

performing, at a vendor device, a KYC check corresponding to the customer;

initiating, by the vendor device, a session with the first card device, wherein the initiating comprises:

scanning the first card device;

sending, to the first card device, an activation command, wherein upon receiving said activation command, the first card device generates key material within the card and uses said key material to place the first card device in an active mode;

requesting the first card device sign a signature to verify its authenticity;

retrieving public key information for the first card device;

associating the public key information with the session;

receiving a payment from the customer, wherein the payment is a first amount in a first currency;

creating a blockchain address linked to the customer and the first card device; and transferring an amount of a first digital currency to the blockchain address, wherein the amount of the first digital currency is equivalent to the received payment from the customer; and performing an offline transfer procedure, the offline transfer procedure comprising:

performing, by a client device, a first scan of the first card device;

verifying, based on the first scan, a transfer state of the first card device and the client device, wherein the transfer state corresponds to an authorization of the first card device and client device being allowed to transfer funds stored in the blockchain address;

performing, by the client device, a second scan of a receiving card device;

verifying, based on the second scan, a receive state of the receiving card device, wherein the receiving state corresponds to the receiving card device being allowed to receive funds;

verifying, based on the first scan and the second scan, authenticity of the first card device and the receiving card device;

generating a shared secret based on a source signature signed from a source public key material of the first card device and a target signature signed from a target public key material of the receiving card device;

duplicating, onto the receiving card device, a source private key material of the first card device;

deleting, from the first card device, the source private key material; and verifying that the receiving card device holds the duplicated source private key material and that the first card device no longer holds the source private key material.

5. The method of claim 4, wherein the first card device further comprises a first hashing module, wherein the first hashing module is configured to:

hash each digest signed, wherein the hashing further comprises hashing a current digest signed with an internally stored historic hash, wherein the historic hash contains all previous hashes of hashes.

6. The method of claim 5, wherein the first card device further comprises a first card state module, wherein the first card state module is configured to:

store a duplication state of the first card device, wherein the duplication state indicates whether the first card device has been duplicated or not;

store a duplication count for the first card device;

store information corresponding to the origin of a key, wherein the origin indicates that the key originated from the first card device or holds a duplicate of the key;

store information indicating if the first card device served as a source of a duplication procedure, wherein the duplication procedure comprises transferring data from the first card device to a target card device.

7. A non-transitory computer readable medium having instructions stored thereon that, when executed by a processing device, cause the processing device to perform operations comprising:

performing, at a vendor device, a KYC check corresponding to a customer;

initiating, by the vendor device, a session with a first card device selected by the customer, wherein the initiating comprises:

scanning the first card device;

sending, to the first card device, an activation command, wherein upon receiving said activation command, the first card device generates key material within the card and uses said key material to place the first card device in an active mode;

requesting the first card device sign a signature to verify its authenticity;

retrieving public key information for the first card device;

associating the public key information with the session;

receiving a payment from the customer, wherein the payment is a first amount in a first currency;

creating a blockchain address linked to the customer and the first card device; and transferring an amount of a first digital currency to the blockchain address, wherein the amount of the first digital currency is equivalent to the received payment from the customer; and performing an offline transfer procedure, the offline transfer procedure comprising:

performing, by a client device, a first scan of the first card device;

verifying, based on the first scan, a transfer state of the first card device and the client device, wherein the transfer state corresponds to an authorization of the first card device and client device being allowed to transfer funds stored in the blockchain address;

performing, by the client device, a second scan of a receiving card device;

verifying, based on the second scan, a receive state of the receiving card device, wherein the receiving state corresponds to the receiving card device being allowed to receive funds;

verifying, based on the first scan and the second scan, authenticity of the first card device and the receiving card device;

generating a shared secret based on a source signature signed from a source public key material of the first card device and a target signature signed from a target public key material of the receiving card device;

duplicating, onto the receiving card device, a source private key material of the first card device;

deleting, from the first card device, the source private key material; and verifying that the receiving card device holds the duplicated source private key material and that the first card device no longer holds the source private key material.

8. The non-transitory computer readable medium of claim 7, wherein the operations further comprise:

hashing, by a first hashing module of the first card device, each digest signed, wherein the hashing further comprises hashing a current digest signed with an internally stored historic hash, wherein the historic hash contains all previous hashes of hashes.

9. The non-transitory computer readable medium of claim 8, wherein the operations further comprise:

storing, by a first card state module of the first card device, a duplication state of the first card device, wherein the duplication state indicates whether the first card device has been duplicated or not;

storing a duplication count for the first card device;

storing information corresponding to the origin of a key, wherein the origin indicates that the key originated from the first card device or holds a duplicate of the key;

storing information indicating if the first card device served as a source of a duplication procedure, wherein the duplication procedure comprises transferring data from the first card device to a target card device.

* * * * *